(12) United States Patent
Sugisawa

(10) Patent No.: US 8,508,603 B2
(45) Date of Patent: Aug. 13, 2013

(54) OBJECT DETECTION DEVICE, OBJECT DETECTION SYSTEM, INTEGRATED CIRCUIT FOR OBJECT DETECTION, AND OBJECT DETECTION METHOD

(75) Inventor: Yuji Sugisawa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 12/996,845

(22) PCT Filed: Apr. 9, 2010

(86) PCT No.: PCT/JP2010/002612
§ 371 (c)(1),
(2), (4) Date: Dec. 8, 2010

(87) PCT Pub. No.: WO2010/116763
PCT Pub. Date: Oct. 14, 2010

(65) Prior Publication Data
US 2011/0164149 A1    Jul. 7, 2011

(30) Foreign Application Priority Data

Apr. 10, 2009  (JP) ................................ 2009-095809

(51) Int. Cl.
*G06K 9/62* (2006.01)
*G06K 9/32* (2006.01)
*H04N 5/225* (2006.01)

(52) U.S. Cl.
USPC ................... 348/208.14; 348/231.3; 382/103; 382/209

(58) Field of Classification Search
USPC ........................................ 382/209
See application file for complete search history.

(56) References Cited

U.S. PATENT DOCUMENTS

| 5,963,221 A | 10/1999 | Shimizu et al. |
| 2002/0175997 A1* | 11/2002 | Takata et al. ................... 348/143 |
| 2005/0123201 A1* | 6/2005 | Nakashima et al. .......... 382/195 |
| 2007/0030899 A1 | 2/2007 | Iguchi et al. |
| 2007/0110321 A1* | 5/2007 | Okada et al. ................... 382/209 |
| 2010/0232712 A1* | 9/2010 | Tomita et al. ................. 382/209 |

FOREIGN PATENT DOCUMENTS

| CN | 1403932 | 3/2003 |
| CN | 1909666 | 2/2007 |
| EP | 1 845 711 | 10/2007 |
| JP | 9-116828 | 5/1997 |
| JP | 2007-20029 | 1/2007 |
| JP | 2007-135115 | 5/2007 |
| JP | 2008-257321 | 10/2008 |
| WO | 2008/129875 | 10/2008 |

OTHER PUBLICATIONS

International Search Report issued May 11, 2010 in International (PCT) Application No. PCT/JP2010/002612.

* cited by examiner

*Primary Examiner* — John Villecco
*Assistant Examiner* — Dwight C Tejano
(74) *Attorney, Agent, or Firm* — Wenderoth, Lind & Ponack, L.L.P.

(57) ABSTRACT

An object detection device that shares a bus with an external memory and another device includes a data acquisition unit that acquires original image data from the external memory via the bus, a reduction processing unit that generates pieces of reduced image data from the original image data at differing reduction rates after the data acquisition unit acquires the original image data once, and an object detection unit that detects a position at which an object appears in the pieces of reduced image data by performing matching processing on the pieces of reduced image data using a template for the object.

15 Claims, 19 Drawing Sheets

FIG. 4

| Reduction ID | Width (pixels) | Height (pixels) | Reduction rate |
|---|---|---|---|
| 0 | 320 | 240 | $(1/1.22)^0$ |
| 1 | 262 | 196 | $(1/1.22)^1$ |
| 2 | 214 | 160 | $(1/1.22)^2$ |
| 3 | 175 | 131 | $(1/1.22)^3$ |
| 4 | 143 | 107 | $(1/1.22)^4$ |
| 5 | 117 | 87 | $(1/1.22)^5$ |
| 6 | 95 | 71 | $(1/1.22)^6$ |
| 7 | 77 | 58 | $(1/1.22)^7$ |
| 8 | 63 | 47 | $(1/1.22)^8$ |
| 9 | 51 | 38 | $(1/1.22)^9$ |
| 10 | 41 | 31 | $(1/1.22)^{10}$ |
| 11 | 33 | 25 | $(1/1.22)^{11}$ |

FIG. 17

| Reduction ID | Width (pixels) | Height (pixels) | Reduction rate |
|---|---|---|---|
| 0 | 320 | 240 | $(1/1.11)^0$ |
| 1 | 280 | 216 | $(1/1.11)^1$ |
| 2 | 259 | 194 | $(1/1.11)^2$ |
| 3 | 233 | 175 | $(1/1.11)^3$ |
| 4 | 210 | 158 | $(1/1.11)^4$ |
| 5 | 189 | 142 | $(1/1.11)^5$ |
| 6 | 171 | 128 | $(1/1.11)^6$ |
| 7 | 154 | 115 | $(1/1.11)^7$ |
| 8 | 138 | 104 | $(1/1.11)^8$ |
| 9 | 125 | 93 | $(1/1.11)^9$ |
| 10 | 112 | 84 | $(1/1.11)^{10}$ |
| 11 | 101 | 76 | $(1/1.11)^{11}$ |
| ... | ... | ... | ... |
| 22 | 32 | 24 | $(1/1.11)^{22}$ |

OBJECT DETECTION DEVICE, OBJECT DETECTION SYSTEM, INTEGRATED CIRCUIT FOR OBJECT DETECTION, AND OBJECT DETECTION METHOD

BACKGROUND OF THE INVENTION

I. Technical Field

The present invention relates to detecting a specified object included in image data.

II. Description of the Related Art

Conventionally, imaging devices such as digital still cameras, video cameras, etc. have had the function of detecting a region within a captured image in which a specified object is photographed, and the control focus of the camera is based on the detection results.

An object detection method that detects the position of an object within a captured image has been proposed, the method being able to detect the positions of multiple objects with differing sizes within the image.

A proposed image processing device (object detection device) that uses this sort of object detection method searches for a region in which an object appears by performing matching processing (hereinafter referred to as "template matching processing"), using a template TP that reflects features of an object, on an original image G0 and a plurality of reduced images G1, G2, ..., G7 with differing resolutions generated from the original image G0, as shown for example in FIG. 18 (see Japanese Patent Application Publication No. 2007-135115 and Japanese Patent Application Publication No. 2008-257321).

FIG. 19 is a block diagram showing the configuration of the object detection device recited in Japanese Patent Application Publication No. 2007-135115.

A face detection unit 1001, which forms part of the image processing device in Japanese Patent Application Publication No. 2007-135115, acquires an original image G0 from an image Random Access Memory (RAM) 1002 via a bus 1003, generates a plurality of reduced images G1, G2, ..., G7 with differing reduction rates from the original image G0 via a resolution conversion unit 1015, and stores the reduced images in both an internal image memory 1021 and, via the bus 1003, in the image RAM 1002. A face detection core 1007 performs template matching processing on the reduced images G1, G2, ..., G7 stored in the image memory 1021.

Furthermore, Japanese Patent Application Publication No. 2008-257321 discloses an example of a face detection device (object detection device) provided with a resolution conversion circuit that generates reduced image data by converting the resolution of original image data, and with a face detection circuit that detects a face by performing template matching processing on the reduced image data, wherein all of the reduced image data generated by the resolution conversion circuit is stored in an image memory provided externally to the resolution conversion circuit and the face detection circuit.

SUMMARY OF THE INVENTION

Recently, however, digital still cameras, video cameras, etc. that have an object detection function to detect the position of an object also have other functions, and an object detection device now typically acquires image data from an image memory using a bus shared by other devices.

Accordingly, in the object detection device recited in Japanese Patent Application Publication No. 2007-135115, if other devices occupy the bus to acquire data from the image memory, acquisition of original image data via the bus by the object detection device will be restricted, which may reduce performance of the object detection device. On the other hand, if the object detection device occupies the bus to acquire original image data from the image memory, acquisition of data via the bus by other devices will be restricted, which may reduce performance of the other devices.

In the object detection device recited in Japanese Patent Application Publication No. 2008-257321 as well, if the resolution conversion circuit and face detection circuit that form part of the object detection device acquire reduced image data from an image memory via a bus shared by other devices, then as with the object detection device recited in Japanese Patent Application Publication No. 2007-435115, the performance of the object detection device or of the other devices may be reduced.

The present invention has been conceived by taking the above reasons into consideration, and it is an object thereof to provide an object detection device that controls reduction of performance.

To solve the above problems, an object detection device according to the present invention shares a bus with an external memory and another device and comprises: a data acquisition unit operable to acquire original image data from the external memory via the bus; a storage unit storing the original image data acquired by the data acquisition unit and a plurality of pieces of reduced image data generated from the original image data; a reduction processing unit operable to generate the pieces of reduced image data from the original image data at differing reduction rates; and an object detection unit operable to detect a position of a specified object by performing matching processing on the pieces of reduced image data using an object template.

With the above structure, the object detection device reduces the frequency with which the object detection device acquires the original image data from the external memory via the bus. Therefore, even if the probability that another device occupies the bus is high, the object detection device prevents a lowering in processing performance of the object detection device due to restriction on acquisition of original image data by the object detection device via the bus. Furthermore, since the object detection device having the above structure reduces the probability of the object detection device occupying the bus to acquire original image data from the external memory via the bus, the object detection device prevents a lowering in processing performance of other devices due to restriction on acquisition of data by the other devices via the bus. Additionally, since the object detection device reduces the frequency with which original image data is acquired from the external memory via the bus, the number of times the external memory is accessed is reduced, which reduces power consumption in the external memory.

In the present structure, the storage unit may include a first storage unit and a second storage unit. The object detection unit may perform matching processing on each piece of reduced image data stored in the first storage unit using the object template. When the reduction processing unit stores, in the second storage unit, reduced image data generated by performing reduction processing at a predetermined reduction rate on a piece of reduced image data stored in the first storage unit, the piece of reduced image data stored in the first storage unit may be deleted, and the object detection unit may perform matching processing on the reduced image data stored in the second storage unit using the object template. When the reduction processing unit stores, in the first storage unit, reduced image data generated by performing reduction processing at the predetermined reduction rate on the reduced image data stored in the second storage unit, the reduced image data stored in the second storage unit may be deleted.

With the above structure, the object detection device reduces the original image data or reduced image data that is to be stored in the first storage unit or the second storage unit. Therefore, the storage capacity of the first storage unit and the second storage unit is reduced, which reduces power consumption in the first storage unit and the second storage unit.

The present structure may further comprise a reduction rate calculation unit operable to calculate a relative reduction rate, with respect to standard image data that is the original image data or reduced image data, of reduced image data generated by the reduction processing unit repeatedly performing reduction processing on the standard image data at a predetermined reduction rate. The present structure may also further comprise an image reduction control unit operable (i) to store a relative reduction rate threshold that is a threshold for the relative reduction rate of the reduced image data generated by the reduction processing unit and (ii) to cause the data acquisition unit to acquire the original image data from the external memory when the relative reduction rate calculated by the reduction rate calculation unit falls below the relative reduction rate threshold.

When generating a plurality of pieces of reduced image data, the object detection device having the above structure reduces the frequency with which original image data is acquired from the external memory via the bus. Therefore, even if the probability that another device occupies the bus is high, the object detection device prevents a lowering in processing performance of the object detection device due to restriction on the object detection device acquiring original image data via the bus. Furthermore, since the object detection device reduces the probability of the object detection device occupying the bus to acquire original image data from the external memory via the bus, the object detection device prevents a lowering in processing performance of other devices due to restriction on acquisition of data by the other devices via the bus. Additionally, since the object detection device reduces the frequency with which original image data is acquired from the external memory via the bus, the number of times the external memory is accessed is reduced, which reduces energy consumption in the external memory.

In the present structure, when the original image data acquired by the data acquisition unit is stored in the second storage unit, the object detection unit may perform matching processing on the original image data stored in the second storage unit using the object template. When the reduction processing unit stores, in the first storage unit, reduced image data generated by performing reduction processing at the predetermined reduction rate on the original image data stored in the second storage unit, the original image data stored in the second storage unit may be deleted.

In the object detection device having the above structure, it is possible to perform matching processing also on original image data using a template for a specified object, which expands the range of the object to be detected.

In the present structure, when the reduction processing unit stores, in the second storage unit, reduced image data generated by performing reduction processing at any reduction rate on the original image data obtained by the data acquisition unit, the object detection unit may perform matching processing on the reduced image data stored in the second storage unit using the object template. When the reduction processing unit stores, in the first storage unit, reduced image data generated by performing reduction processing at the predetermined reduction rate on the reduced image data stored in the second storage unit, the reduced image data stored in the second storage unit may be deleted.

In the object detection device having the above structure, matching processing using a template is not performed starting with original image data, but rather with reduced image data obtained by performing reduction processing on the original image data at any reduction rate. Therefore, the number of times to perform the matching processing using the template is reduced, which reduces the processing load and improves processing performance.

The present structure may further comprise a reduction processing frequency counter operable to count a frequency of reduction processing by the reduction processing unit on standard image data that is the original image data or reduced image data. The present structure may also further comprise an image reduction control unit operable (i) to store a reduction processing threshold for the frequency of reduction processing and (ii) to cause the data acquisition unit to acquire the original image data from the external memory when the frequency of reduction processing exceeds the reduction processing threshold.

When generating a plurality of pieces of reduced image data, the object detection device having the above structure reduces the frequency with which original image data is acquired from the external memory via the bus. Therefore, even if the probability that another device occupies the bus is high, the object detection device prevents a lowering in processing performance of the object detection device due to restriction on the object detection device acquiring original image data via the bus. Furthermore, since the object detection device reduces the probability of the object detection device occupying the bus to acquire original image data from the external memory via the bus, the object detection device prevents a lowering in processing performance of other devices due to restriction on acquisition of data by the other devices via the bus. Additionally, since the object detection device reduces the frequency with which original image data is acquired from the external memory via the bus, the number of times the external memory is accessed is reduced, which reduces power consumption in the external memory.

The present structure may further comprise a threshold varying unit operable to vary the relative reduction rate threshold in accordance with image quality of the original image data.

In the object detection device having the above structure, by providing a threshold varying unit operable to vary the relative reduction rate threshold in accordance with image quality of the original image data, the relative reduction rate threshold is appropriately varied in accordance with image quality of the original image, thus improving precision of object detection.

The present structure may further comprise a bus traffic supervision unit operable to supervise bus traffic in the bus, and the image reduction control unit may cause the data acquisition unit to acquire the original image data from the external memory when bus traffic detected by the bus traffic supervision unit is equal to or less than a predetermined value.

In the object detection device having the above structure, in accordance with the bus traffic detected by the bus traffic supervision unit, when bus traffic is equal to or less than a predetermined value, the original image data is acquired. This increases the frequency with which reduced image data is generated directly from the original image data, thereby improving precision of object detection.

In the present structure, the reduction rate calculation unit may calculate an absolute reduction rate of the reduced image data of the original image data, and the image reduction control unit may store an absolute reduction rate threshold of the absolute reduction rate and stop the reduction processing by the reduction processing unit when the absolute reduction rate falls below the absolute reduction rate threshold.

In the object detection device having the above structure, the frequency of reduction processing is reduced to a necessary minimum in accordance with the range of the object to be detected. This reduces the processing load, thereby improving processing performance.

In the present structure, the first storage unit may have storage capacity equivalent to a size of reduced image data generated by performing reduction processing once on the original image data. The second storage unit may include a first storage area having a storage capacity equivalent to a size of image data whose dimensions match a horizontal length of the original image data and a vertical height of the object template, and a second storage area having a storage capacity equivalent to a size of image data whose dimensions match (i) a horizontal length of a reduced image formed by reduced image data generated by performing reduction processing one more time on reduced image data generated by performing reduction processing once on the original image data stored by the second storage unit and (ii) a vertical height of the reduced image minus the vertical height of the object template.

In the object detection device having the above structure, the storage capacity of the first storage unit and the second storage unit is reduced, which reduces power consumption by the first storage unit and the second storage unit.

In the present structure, the storage unit may include (i) the first storage unit and (ii) the second storage unit, the second storage unit including a first storage area, a second storage area, and a third storage area. When a first piece of image data is stored in the first storage area, a second piece of image data is stored in the second storage area, and a piece of image data identical to the second piece of image data is stored in the third storage area, the first piece of image data and the second piece of image data representing a first region and a second region that form part of the original image data acquired by the data acquisition unit, then the object detection unit may perform matching processing on the first piece of image data and the second piece of image data using the object template. When the reduction processing unit stores, in the first storage unit, reduced image data generated by performing reduction processing at the predetermined reduction rate on the first piece of image data and the second piece of image data, then only the first piece of image data and the second piece of image data stored in the second storage unit may be deleted, and the object detection unit may perform matching processing on reduced image data stored in the first storage unit using the object template. When the reduction processing unit stores, in the first storage area and the second storage area of the second storage unit, reduced image data obtained by performing reduction processing at the predetermined reduction rate on the reduced image data stored in the first storage unit, then the object detection unit may perform matching processing on the reduced image data stored in the first storage area and in the second storage area using the object template, only the reduced image data recorded in the first storage area and in the second storage area of the second storage unit may be deleted, a third piece of image data representing a third region that differs from the first region and the second region and that forms part of the original image data acquired by the data acquisition unit may be stored in the first storage area, and a piece of image data identical to the third piece of image data may be stored in the second storage area.

In the object detection device having the above structure, template matching processing is performed on the entire original image data by the data acquisition unit repeatedly acquiring only a part of the original image data at a time. Since regions represented by parts of the original image data acquired by the data acquisition unit each time overlap, it becomes possible to perform template matching processing on the original image data or reduced image data while sliding the template one pixel at a time, which improves precision of image detection.

In the present structure, the first storage unit may have a storage capacity equivalent to a size of image data whose dimensions match (i) a horizontal length of a reduced image formed by reduced image data generated by performing reduction processing once on the original image data and (ii) a vertical height that is twice a vertical height of the object template. The second storage unit may include a first storage area, a second storage area, and a third storage area that each have a storage capacity equivalent to a size of image data whose dimensions match a horizontal length of the original image data and a vertical height of the object template.

In the object detection device having the above structure, the storage capacity of the first storage unit and the second storage unit is further reduced, which achieves an even greater reduction in power consumption by the first storage unit and the second storage unit.

An object detection system according to the present invention is provided with an image processing device operable to perform predetermined image processing on externally input original image data, an image memory storing original image data output by the image processing device, a motion estimation device operable to acquire the original image data stored by the image memory and to detect a region in the original image data in which a moving specified object appears, a processor operable to control the motion estimation device in accordance with a control signal input from the image processing device, the object detection device described in the Solution to Problem operable to detect a position of a specified object in the region detected by the motion estimation device in greater detail, and a bus operable to transfer the original image data between (i) each of the image processing device, the motion estimation device, the processor, and the object detection processing device, and (ii) the image memory.

In the object detection system with the above structure, processing performance in the object detection device is improved by providing the object detection device described above.

An integrated circuit for object detection processing according to the present invention is provided with a motion estimation circuit operable to acquire original image data stored by an external memory and to detect a region in the original image data in which a moving specified object appears, a processor operable to control the motion estimation circuit in accordance with a control signal input from the image processing circuit, the object detection processing device described in the Solution to Problem operable to detect a position of a specified object in the region detected by the motion estimation circuit in greater detail, and a bus operable to transfer the original image data between (i) each of the image processing circuit, an image output circuit, the motion estimation circuit, the processor, and the object detection processing device, and (ii) the image memory.

In the integrated circuit with the above structure, processing performance in the object detection processing integrated circuit is improved by providing the object detection processing device described above.

A camera with an object detection function according to the present invention is provided with a camera unit, an image display device operable to display an image photographed by the camera, an image processing device operable to perform image processing on image data input from the camera, an image memory storing image data output by the image processing device, an image display control device operable to cause the image display device to display the image data stored in the image memory, a motion estimation device operable to acquire the image data stored by the image memory and to detect a region in the image data in which a moving specified object appears, a processor operable to control the motion estimation device in accordance with a control signal input from the image processing device, the object detection device described in the Solution to Problem operable to detect a position of a specified object in the region detected by the motion estimation device in greater detail, and a bus operable to transfer the image data between (i) each of the image processing device, the image display control device, the motion estimation device, the processor, and the object detection processing device, and (ii) the image memory.

In the camera with the above structure according to the present invention, processing performance in the camera is improved by providing the object detection processing device described above.

An object detection method according to the present invention includes the steps of: acquiring original image data from external memory via a bus, generating a plurality of pieces of reduced image data having differing reduction rates by performing reduction processing on the original image data acquired in the acquisition step, and detecting a position at which an object appears in the pieces of reduced image data by performing matching processing on the pieces of reduced image data using an object template.

In the object detection method with the above structure, overall processing performance in a device is improved, since even if the frequency of reduction processing is increased to improve detection precision, the frequency with which original image data is acquired from the external memory via the bus is controlled.

BRIEF DESCRIPTION OF THE DRAWINGS

FIG. 4 shows reduced image data used by the object detection device in Embodiment 1.

FIG. 17 shows reduced image data used by an object detection device in a Modification.

DETAILED DESCRIPTION OF THE INVENTION

Embodiment 1

The following describes an object detection system that includes an object detection device 1 according to the present invention.

<1> Structure

Figure 1:
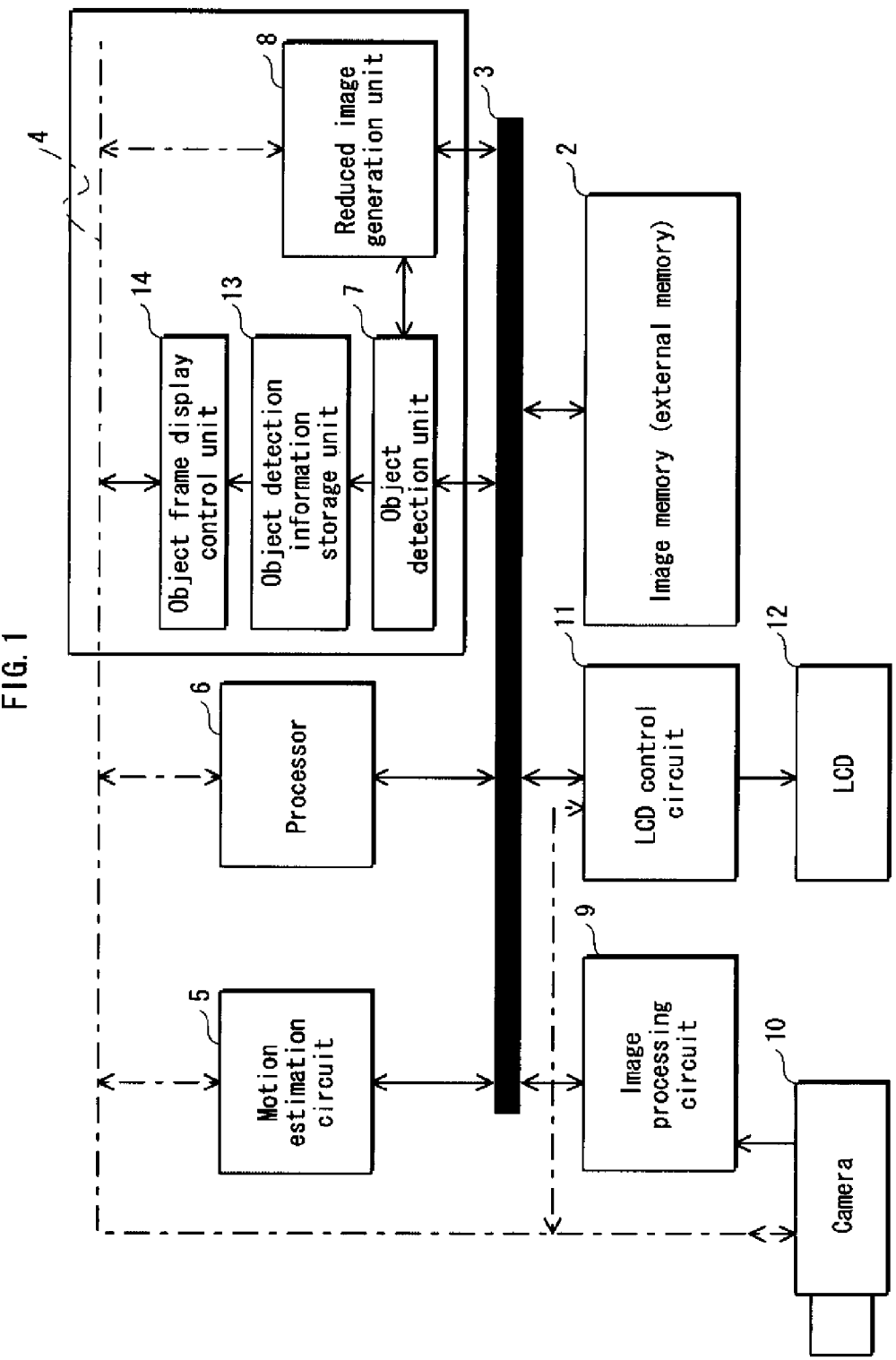
FIG. 1 is a block diagram showing a structure of an object detection system that includes an object detection device in Embodiment 1.

As shown in FIG. 1, an object detection system according to the present invention includes a camera 10, Liquid Crystal Display (LCD) 12, image processing circuit 9, LCD control circuit 11, motion estimation circuit 5, and processor 6. The object detection device 1 detects a position of a moving object, which is detected by the motion estimation circuit 5 and appears in a region of a predetermined size, in greater detail than the motion estimation circuit 5.

Furthermore, a memory bus 3 and a processor bus 4 are provided in the object detection system. The memory bus 3 is shared by the image processing circuit 9, LCD control circuit 11, motion estimation circuit 5, processor 6, object detection device 1, and image memory 2, making it possible for these elements to transmit original image data back and forth. The processor bus 4 is shared by the image processing circuit 9, LCD control circuit 11, motion estimation circuit 5, object detection device 1, and processor 6, making it possible for these elements to transmit and receive a variety of signals. Also, the object detection system is provided with an object detection system control device (not shown in the figures) that is provided with an operation unit (not shown in the figures) that a user operates to cause the object detection system to start or stop operating.

The camera 10 is, for example, a digital still camera and outputs captured image data (hereinafter, "original image data"). The camera 10 is provided with a lens (not shown in the figures), an image sensor (not shown in the figures) in which a plurality of light receiving elements (not shown in the figures) are disposed on the imaging surface, and an adjustment unit to stop down the lens, focus, and zoom so that an optical image of an object forms on the imaging surface of the image sensor. The image sensor is provided with the plurality of light receiving elements disposed on the imaging surface, and output of each light receiving element changes depending on luminance at the position at which the light receiving element is disposed. Accordingly, the camera 10 generates original image data reflecting luminance distribution of the imaging surface in the image sensor and outputs the original image data to the image processing circuit 9. The shutter speed of the camera 10 can be freely changed.

The image processing circuit 9 is connected to the camera 10 and performs high quality picture processing, described below, on original image data input from the camera 10. Upon receiving original image data output by the image sensor in the camera 10, the image processing circuit 9 performs high quality picture processing such as matrix calculation, gamma correction, white balance adjustment, etc. and outputs the original image data yielded by the high quality picture processing to the memory bus 3.

Based on the original image data stored in the image memory 2, the LCD control circuit 11 displays the image captured by the camera 10 on the LCD 12.

The motion estimation circuit 5 acquires original image data stored in the image memory 2 and detects, within the entire original image data, a region of a predetermined size in which a moving objects appears.

The image memory 2 stores original image data, etc. output from the image processing circuit 9. In this Embodiment, the image memory 2 stores one frame of original image data transmitted by the image processing circuit 9.

The motion estimation circuit 5 detects a region of a predetermined size in which a moving object appears by, for example, comparing edge detection results for a background image with edge detection results for an input image. Note that the motion estimation circuit is not limited in this way, and may detect motion by another method, such as by calculating the difference between pixels.

The processor 6 controls the motion estimation circuit 5 based on a completion of transmission signal, described below, input from the image processing circuit 9. Specifically, the processor 6 causes the motion estimation circuit 5 to perform motion estimation processing upon receiving a completion of transmission signal from the image processing circuit 9 when transmission of original image data from the image processing circuit 9 to the image memory 2 is complete. Based on the results of motion estimation processing input from the motion estimation circuit 5, the processor 6 then causes the object detection circuit 1 to detect an object in a region of a predetermined size in which a moving object appears.

Figure 2:
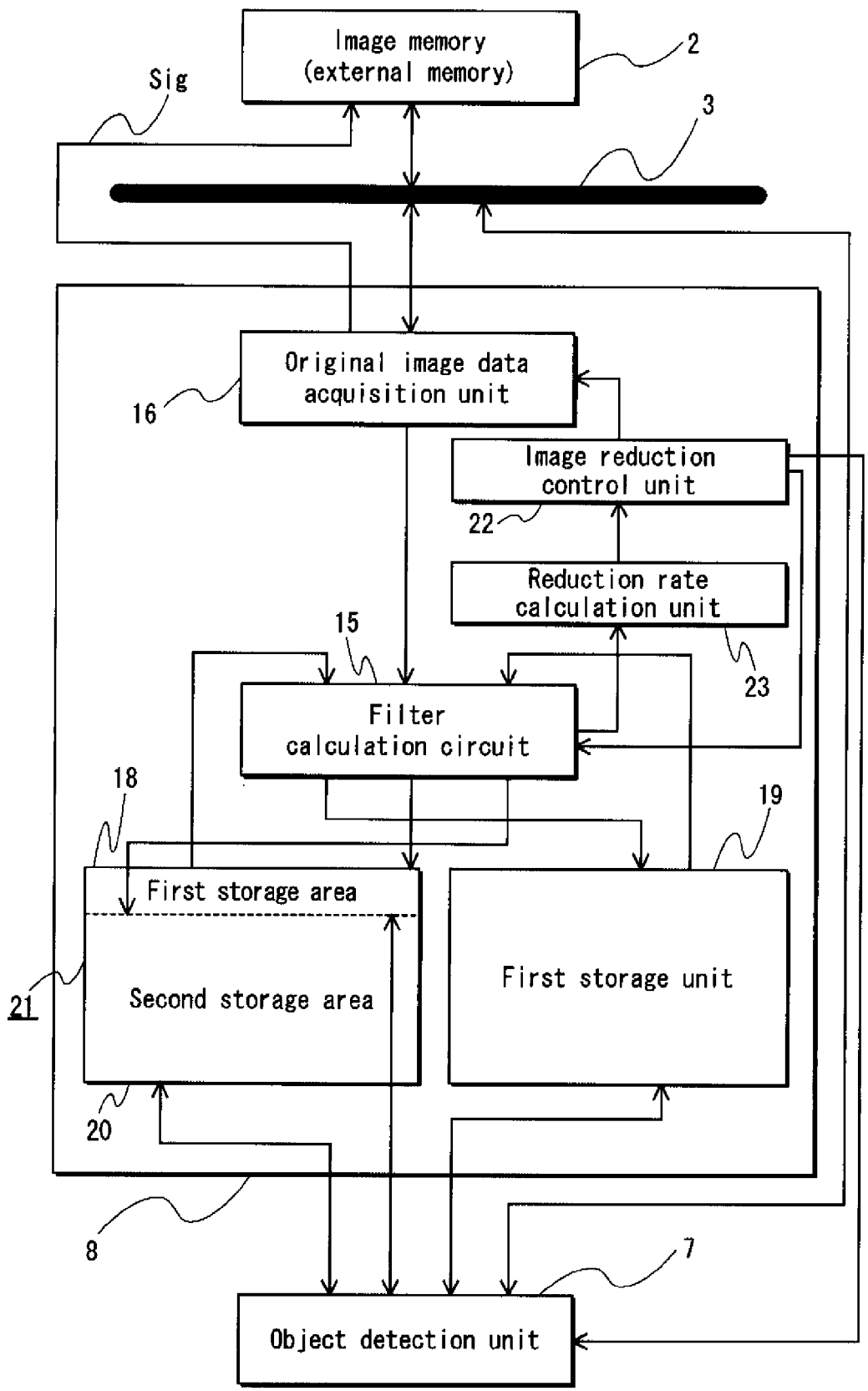
FIG. 2 is a block diagram showing a structure of the object detection device in Embodiment 1.

As shown in FIG. 2, the object detection device 1 is provided with a reduced image generation unit 8 and an object detection unit 7. The reduced image generation unit 8 generates a plurality of reduced images from original image data. The object detection unit 7 detects whether a specified object appears within the plurality of reduced images generated by the reduced image generation unit 8, and if so, detects the position of the specified object by performing matching processing (hereinafter, "template matching processing") on the plurality of reduced images using a template TP that reflects features of the specified object. The object detection device 1 is also provided with an object detection information storage unit 13 and an object frame display control unit 14. The object detection information storage unit 13 stores a plurality of pieces of object detection information (coordinate position of a specified object, reduction ID of reduced image, and direction of specified object) input from the object detection unit 7. The object frame display control unit 14 (i) extracts, from the plurality of pieces of object detection information stored in the object detection information storage unit 13, pieces of object detection information for which the difference between the coordinate position of a specified object is smaller than a predetermined value and (ii) unifies these pieces of object detection information, outputting the unified piece of information to the processor bus 4 as one piece of object frame display information.

Figure 3:
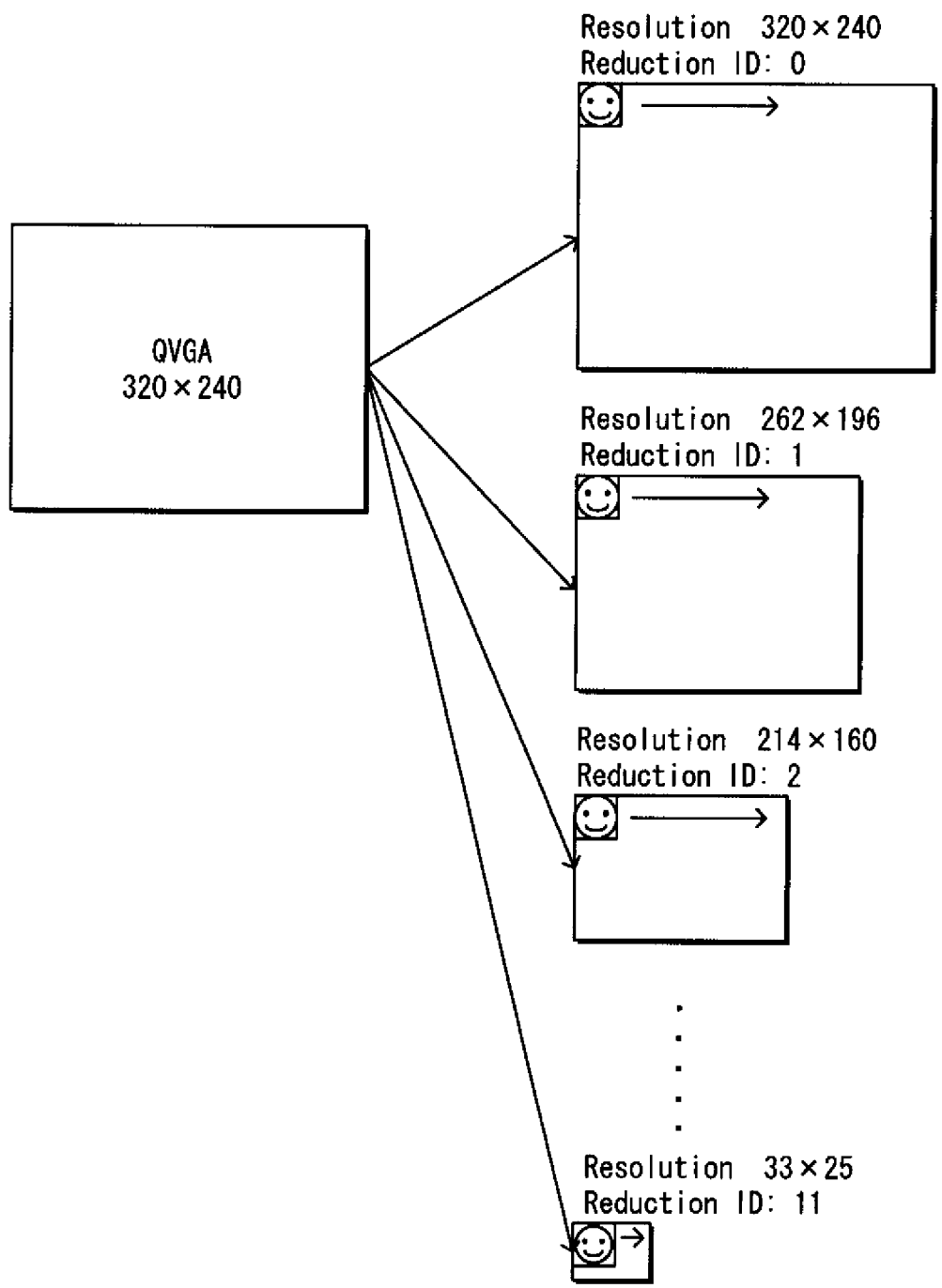
FIG. 3 illustrates template matching processing performed by an object detection unit that forms part of the object detection device in Embodiment 1.

As shown in FIG. 3, the object detection unit 7 performs template matching processing, using a template TP (24 pixels wide×24 pixels high) that reflects features of a specified object, on original image data that is Quarter Video Graphics Array (QVGA) resolution (320 pixels wide×240 pixels high) and on reduced images that are of a plurality of resolutions (for example, 256 pixels wide×192 pixels high) lower than QVGA resolution and that are generated by performing reduction processing to reduce the resolution of the original image data.

The object detection unit 7 performs template matching processing on the original image data and on each reduced image, using a template that is 24 pixels high×24 pixels wide, for all points in each reduced image in the order of raster scanning. In this Embodiment, the size of the template TP is constant, and therefore performing template matching processing on a reduced image that has a high reduction rate and a low resolution is equivalent to detecting a specified object that is larger than the template in an image of QVGA resolution. In this way, in original image data and a plurality of reduced images with differing resolutions, a plurality of specified objects of different sizes included in the original image data are detected by performing template matching processing in order using the template TP.

The object detection unit 7 prepares a plurality of templates that reflect features of a human face when facing forward, to the left, to the right, upwards, and downwards, when inclined to the left and to the right, etc. If, for example, a region matching the template reflecting features of a human face when facing to the left is detected, identifying information for the template reflecting features of a human face when facing to the left is output to the object detection information storage unit 13.

The object detection unit 7 can perform template matching processing by sliding the template TP one pixel at a time horizontally and one pixel at a time vertically, or by sliding the template TP one pixel at a time horizontally and 24 pixels, i.e. the vertical height of the template, at a time vertically.

The reduced image generation unit 8 includes the following: an original image data acquisition unit 16, which is a data acquisition unit; a filter calculation circuit 15; a first storage unit 19 and a second storage unit 21, which are storage units; a reduction rate calculation unit 23; and an image reduction control unit 22.

The filter calculation circuit 15 is a reduction processing unit that generates reduced image data by performing reduction processing on original image data acquired by the original image data acquisition unit 16. The filter calculation circuit 15 performs reduction processing on input original image data or on reduced image data via a widely known method such as downsampling, averaging, etc. The filter calculation circuit 15 first performs reduction processing on original image data of QVGA resolution (320 pixels wide×240 pixels high) acquired by the original image data acquisition unit 16 to generate reduced data lower than QVGA resolution (for example, 256 pixels wide×192 pixels high). The filter calculation circuit 15 then repeats reduction processing on the reduced image data to generate reduced images at a plurality of resolutions. The image reduction control unit 22 can change the setting of the reduction rate of the filter calculation circuit 15.

During reduction processing of original image data of QVGA resolution (320 pixels wide×240 pixels high) by the filter calculation circuit 15, the number of pixels in the horizontal direction and the number of pixels in the vertical direction can be reduced to the resolution indicated by Equation (1).

number of pixels in horizontal direction=(number of pixels in horizontal direction at QVGA resolution)×$(1/1.22)^n$ number of pixels in vertical direction=(number of pixels in vertical direction at QVGA resolution)×$(1/1.22)^n$  Equation (1)

In Equation (1), n is a value reflecting the reduction rate, and as the value of n increases, the reduction rate becomes higher. In the following description of the Embodiments, the value of n is described as a value that identifies image data obtained by performing the reduction processing on image data of QVGA resolution; the value of n is thus used as a reduction ID. In other words, image data with a larger reduction ID has a higher reduction rate. For example, in FIG. 3, the resolution of image data with a reduction ID of 1 is 1/1.22 times QVGA resolution, i.e. 82% resolution (262 pixels wide×196 pixels high). The resolution of image data with a reduction ID of 2 is 67% of QVGA resolution (214 pixels wide×160 pixels high).

FIG. 4 shows resolutions identified by reduction IDs and the values of the reduction IDs for a plurality of images with a resolution lower than QVGA resolution generated by reduction to the resolution shown in Equation (1). In the example shown in FIG. 4, reduced images are generated to 11 different resolutions.

The first storage unit 19 stores the reduced images output by the filter calculation circuit 15. The first storage unit 19 has storage capacity equivalent to the size of image data of reduced images generated by performing reduction processing once on an original image.

The second storage unit 21 stores the reduced images output by the filter calculation circuit 15. The second storage unit 21 is composed of a first storage area 18 and a second storage area 20. The first storage area 18 has storage capacity equivalent to the size of image data of an image that matches, in horizontal length, the horizontal length of an original image and that matches, in vertical height, the vertical height of a template TP. The storage capacity of the first storage area 18 is determined by taking into account the minimum necessary size of image data when performing template matching processing using a template TP.

The second storage area 20 has storage capacity equivalent to image data for an image that matches, in horizontal length, a reduced image generated by performing reduction processing one more time on reduced image data generated by performing reduction processing once on original image data, i.e. the horizontal length of a reduced image composed of reduced image data generated by performing reduction processing twice on original image data, and that matches, in vertical height, the vertical height of the reduced image minus the vertical height of the template TP. Note that the first storage unit 19 and the second storage unit 21 are composed of memory.

The original image data acquisition unit 16 is controlled by the image reduction control unit 22, and upon an instruction from the image reduction control unit 22, acquires, by extraction, a part of the original image data, stored in the image memory 2, that is specified by the instruction. The original image data acquisition unit 16 acquires the original image data via the memory bus 3 from the image memory 2 by inputting, into the image memory 2, a transmission request signal Sig.

The reduction rate calculation unit 23 calculates a relative reduction rate that is a reduction rate, relative to original image data or reduced image data used as standard image data, of reduced image data generated by the filter calculation circuit 15 repeatedly performing reduction processing at a predetermined reduction rate. The reduction rate calculation unit 23 counts the frequency at which the filter calculation circuit 15 repeatedly performs reduction processing at a predetermined reduction rate (for example, 1/1.22) on reduced image data (standard image data) stored by the first storage area 18 in the second storage unit 21. For a reduced image obtained by repeatedly performing reduction processing on the reduced image stored by the first storage area 18 in the second storage unit 21, the reduction rate calculation unit 23 outputs, as the relative reduction rate of the reduced image data, a value that is a base of the predetermined reduction rate of the filter calculation circuit 15 raised to the number of reductions. For example, if the filter calculation circuit 15 repeatedly performs reduction processing five times, the relative reduction rate of the reduced image output by the reduction rate calculation unit 23 is $(1/1.22)^5$.

The reduction rate calculation unit 23 also calculates and outputs the reduction rate of reduced image data of original image data (hereinafter, "absolute reduction rate"). The reduction rate calculation unit 23 counts the various reduction rates at which the filter calculation circuit 15 performs reduction processing, as well as the cumulative frequency at which reduction processing is performed at each reduction rate, and outputs, as the absolute reduction rate, a value that is the product of each of the reduction rates of the filter calculation circuit 15 respectively raised to the number of reductions. For example, if the filter calculation circuit 15 performs reduction processing at a reduction rate of 0.37 on original image data to generate reduced image data and then further repeats reduction processing five times at a reduction rate of 1/1.22, the reduction rate calculation unit 23 outputs an absolute reduction rate of $0.37 \times (1/1.22)^5$.

The image reduction control unit 22 stores a relative reduction rate, which is a threshold for a relative reduction rate of reduced image data generated by the filter calculation circuit 15. If the relative reduction rate calculated by the filter calculation circuit 15 has fallen below the relative reduction rate threshold, the image reduction control unit 22 stops reduction processing by the filter calculation circuit 15 and causes the original image data acquisition unit 16 to acquire original image data from the image memory 2. The image reduction control unit 22 compares the relative reduction rate input from the reduction rate calculation unit 23 and the relative reduction rate threshold. If the relative reduction rate has exceeded the relative reduction rate threshold, the image reduction control unit 22 both causes the filter calculation circuit 15 to stop reduction processing, and causes the original image data acquisition unit 16 to acquire part of the original image data from the image memory 2. The image reduction control unit 22 stores a threshold (hereinafter, "absolute reduction rate threshold") for an absolute reduction rate of reduced image data of original image data and compares an absolute reduction rate input from the reduction rate calculation unit 23 with the absolute reduction rate threshold. If the absolute reduction rate has fallen below the absolute reduction rate threshold, the image reduction control unit 22 both causes the filter calculation circuit 15 to stop reduction processing and outputs an object detection completion notification signal, which notifies the processor 6 that object detection processing is complete, to the processor bus 4.

The relative reduction rate threshold can be set to any value. In Embodiment 1, the relative reduction rate threshold is set to 0.55 ($=(1/1.22)^3$).

The absolute reduction rate threshold can be determined by template size. If the size of the template that the object detection unit 7 uses in template matching processing is 24 pixels wide×24 pixels high, and if the reduction ID of reduced image data exceeds 11 (i.e. if the resolution of the reduced image data becomes smaller than 33 pixels wide×25 pixels high), the size of the reduced image data becomes smaller than the size of the template, and therefore template matching processing becomes impossible. Accordingly, the minimum resolution of reduced image data is 33 pixels wide×25 pixels high, which is original image data of QVGA resolution at a reduction rate of $(1/1.22)^{11}$.

From this fact, the absolute reduction rate threshold can be determined as 0.11 ($=(1/1.22)^{11}$).

The object detection system control device is composed of an operation unit (not shown in the figures) provided with appropriate operation buttons and a control circuit (not shown in the figures) that is connected to the operation unit and outputs operation information to the processor bus 4 based on the operation performed via the operation unit.

<2> Operations
<2-1> Overall Operations of Object Detection System

Next, the overall operations of the object detection system according to Embodiment 1 are described.

Figure 5:
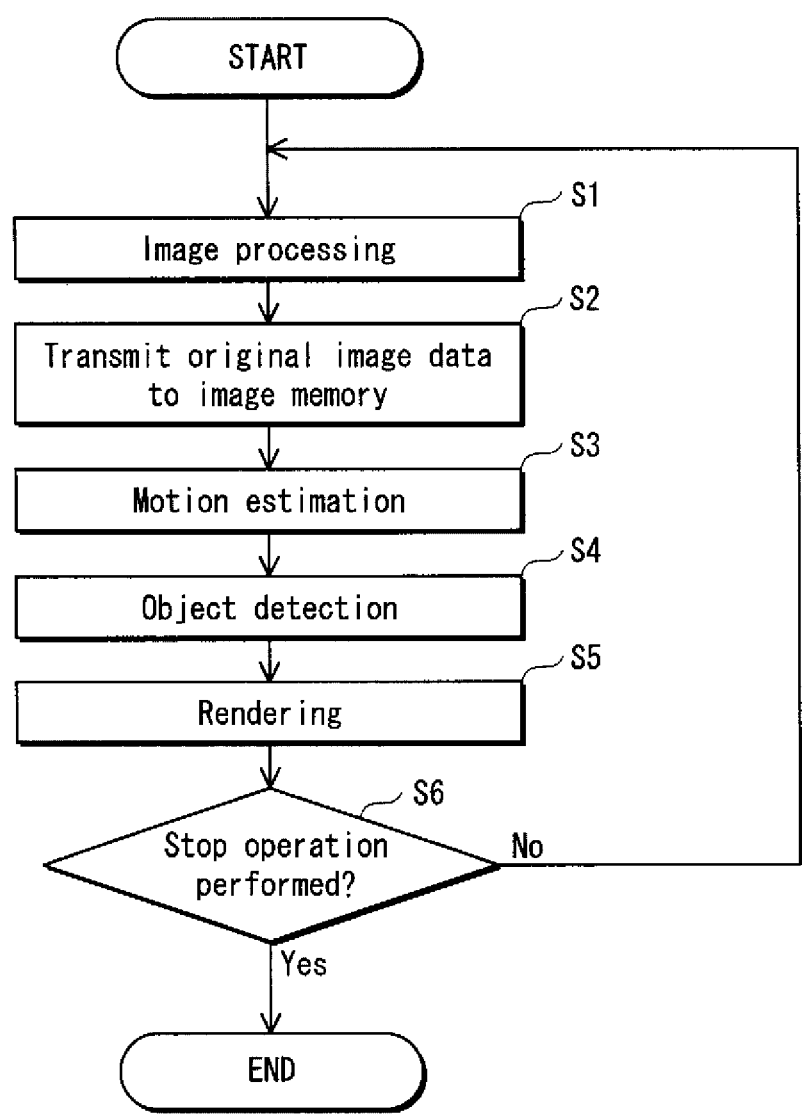
FIG. 5 is a flowchart showing operations of the object detection system that includes an object detection device in Embodiment 1.

FIG. 5 is a flowchart of operations by the object detection system according to Embodiment 1.

First, original image data output from the camera 10 is input into the image processing circuit 9, and image processing is performed (step S1).

Next, original image data output from the image processing circuit 9 is transmitted to the image memory 2 (step S2). When one frame of original image data is completely transmitted to the image memory, the image processing circuit 9 outputs a completion of transmission signal to the processor 6 via the processor bus 4. Upon receiving the completion of transmission signal from the processor bus 4, the processor 6 outputs a start of motion estimation processing signal to the processor bus 4 to cause the motion estimation circuit 5 to start motion estimation processing.

Upon input of the start of motion estimation processing signal from the processor bus 4, the motion estimation circuit 5 starts motion estimation processing (step S3). Upon completion of motion estimation processing, the motion estimation circuit 5 outputs the results of motion estimation processing to the processor bus 4. Upon input of the results of motion estimation processing from the processor bus 4, the processor 6 calculates a detection range for the object detection device 1 to perform object detection processing based on the results of motion estimation processing. The processor 6 then outputs information on the detection range to the processor bus 4.

Upon input, from the processor bus 4, of information on the detection range for performing object detection processing, the object detection device 1 acquires original image data from the image memory 2 via the memory bus 3 and, as described below, performs object detection processing via template matching processing (step S4). Upon completion of object detection processing, the object detection device 1 outputs object frame display information to the processor bus 4.

Upon input of object frame display information from the processor bus 4, the processor 6 generates object frame display data based on the object frame display information. The object frame display data is composed of information necessary for the LCD control circuit 11 to display, on the LCD, an object frame that displays the position of a specified object. The processor 6 then outputs the object frame display data to the processor bus 4.

Upon input of object frame display data from the processor bus 4, the LCD control circuit 11 renders a frame, based on the object frame display data, to enclose a region in which an object appears in a captured image displayed on the LCD 12 (step S5).

Next, the processor 6 determines whether the user has performed a stop operation via the operation unit of the object detection system control device (step S6). Specifically, the processor 6 determines whether a stop operation has been performed by whether or not a stop signal has been input via the processor bus 4 from the object detection system control device.

If the processor 6 determines that a stop operation has been performed (step S6: Yes), the processor 6 stops processing. On the other hand, if the processor 6 determines that a stop operation has not been performed (step S6: No), the processor 6 once again performs rendering via the image processing circuit 9 (step S1).

<2-2> Operations During Object Detection Processing

Figure 6:
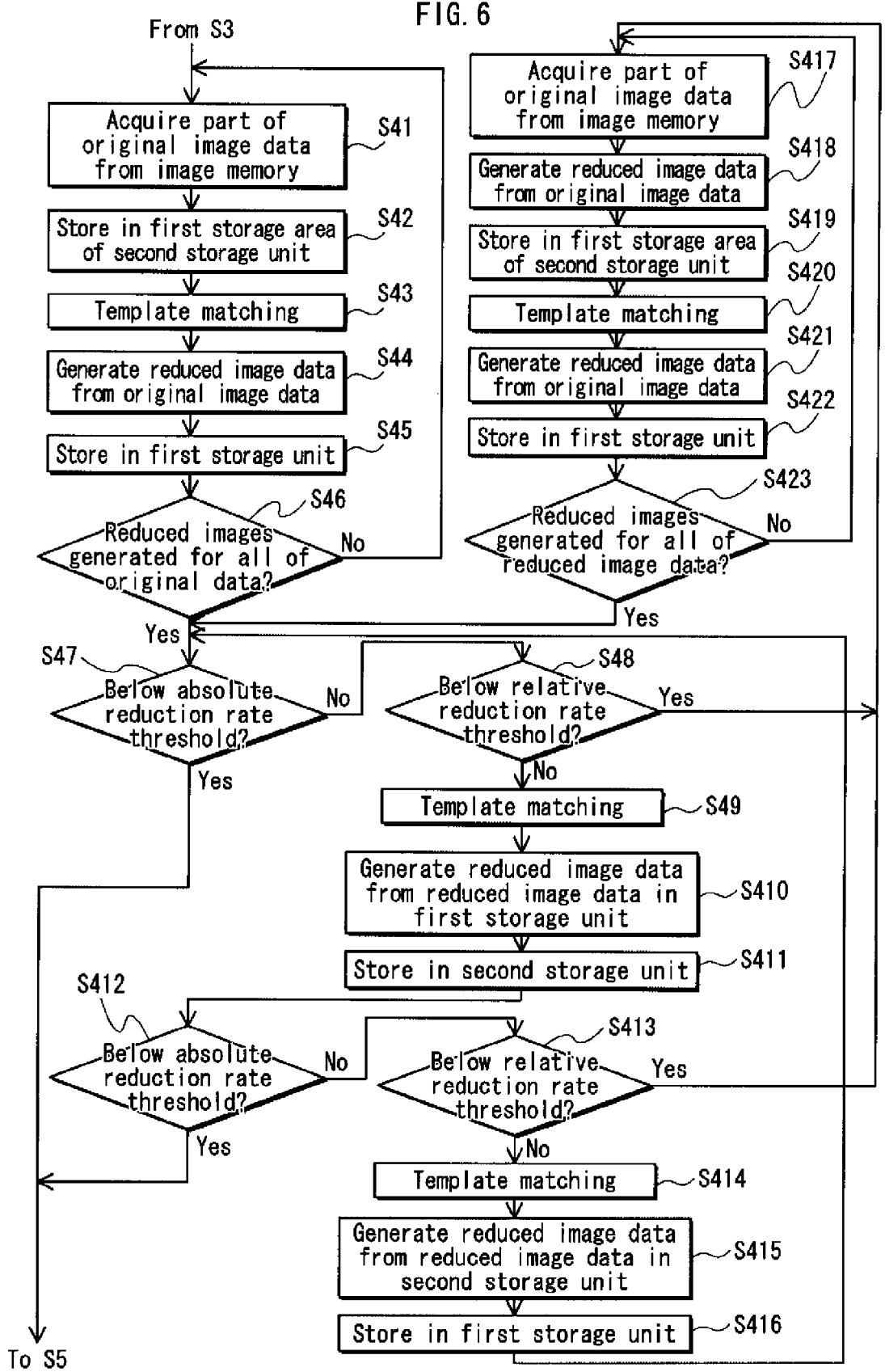
FIG. 6 is a flowchart showing operations during object detection processing by the object detection device in Embodiment 1.

The operations performed during object detection processing in Embodiment 1 are described with reference to the flowchart in FIG. 6. In the following description, original image data is assumed to be QVGA resolution (320 pixels wide×240 pixels high), the size of the template TP is assumed to be 24 pixels wide×24 pixels high, the relative reduction rate threshold is assumed to be set at 0.55 ($=(1/1.22)^3$), and the absolute reduction rate threshold is assumed to be set at 0.11 ($=(1/1.22)^{11}$).

First, the original image data acquisition unit 16 acquires, by extraction, part of the original image data stored in the image memory 2 (step S41). The original image data is composed of image data in an object detection range of a predetermined size set by the processor 6 and has QVGA resolution.

Figure 7:
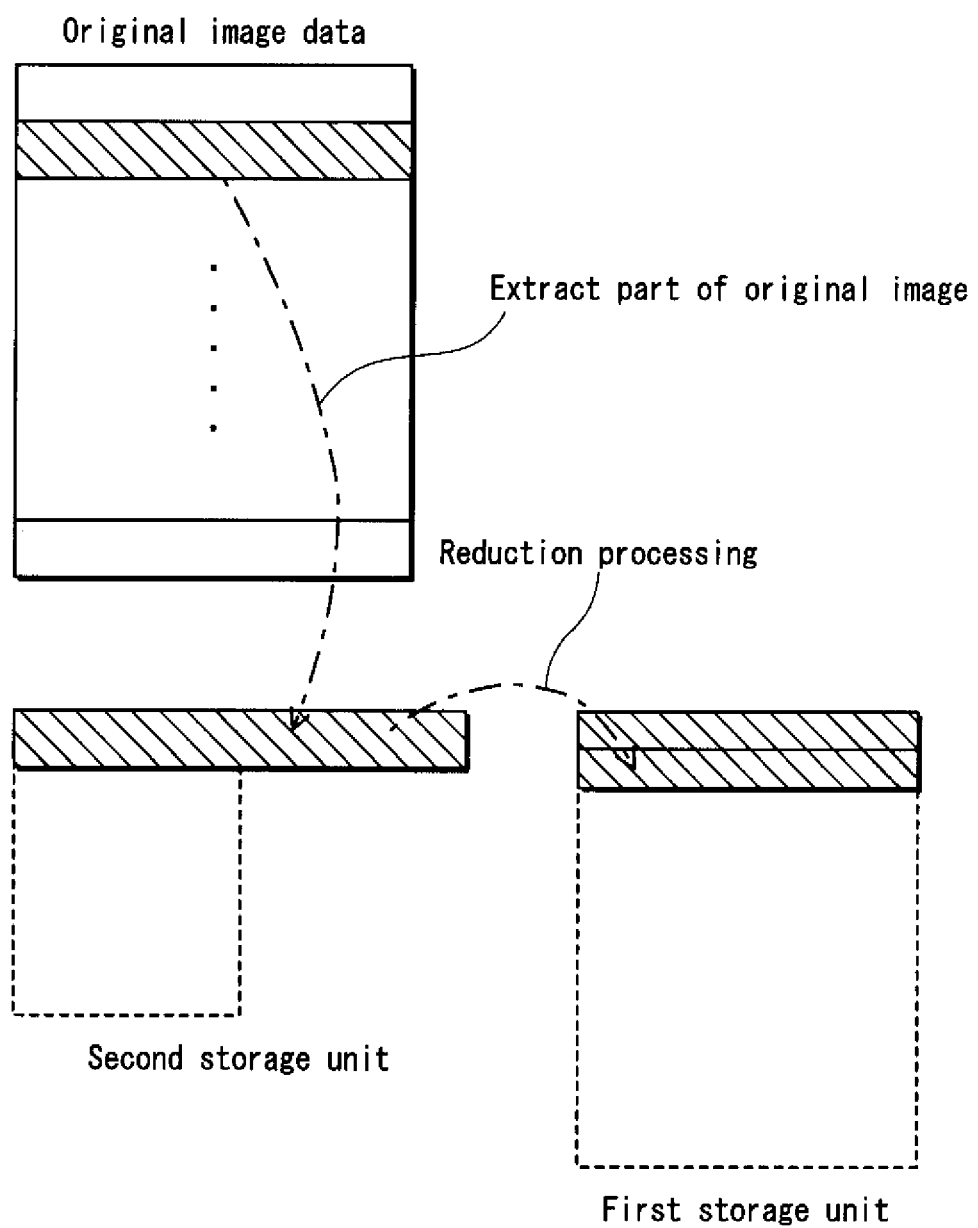
FIG. 7 is a conceptual diagram illustrating use of a first storage unit and a second storage unit when acquiring part of an original image during object detection processing by the object detection device in Embodiment 1.

Next, the original image data acquisition unit 16 stores the original image data as is in the first storage area 18 of the second storage unit 21 (step S42). As shown in FIG. 7, the original image data acquisition unit 16 extracts part of the original image data with a width that is the horizontal length of the original image and a height that is the size of a template for a specified object and stores the extracted part of the original image data in the first storage area 18 of the second storage unit 21.

Next, the object detection unit 7 performs template matching processing, using a template TP for a specified object, on the part of the original image data stored in the first storage area 18 of the second storage unit 21 (step S43).

At the same time the object detection unit 7 performs template matching processing on the original image data stored in the second storage unit 21, the filter calculation circuit 15 generates reduced image data by performing reduction processing at a reduction rate of 1/1.22 on part of the original image data stored in the first storage area 18 of the second storage unit 21 (step S44) and stores the reduced image data in the first storage unit 19 (step S45). When storage of reduced image data in the first storage unit 19 is complete, the second storage unit 21 deletes the original image data stored within the second storage unit 21.

Next, the image reduction control unit 22 determines whether or not reduction processing has been performed on all of the original image data (step S46).

If, in step S46, the image reduction control unit 22 determines that reduction processing has not been performed on all of the original image data (step S46: No), then as shown in FIG. 7, the original image data acquisition unit 16 once again extracts part of the original image data stored in the image memory 2 (step S41) and stores the extracted part as is in the first storage area 18 of the second storage unit 21 (step 42).

Figure 8:
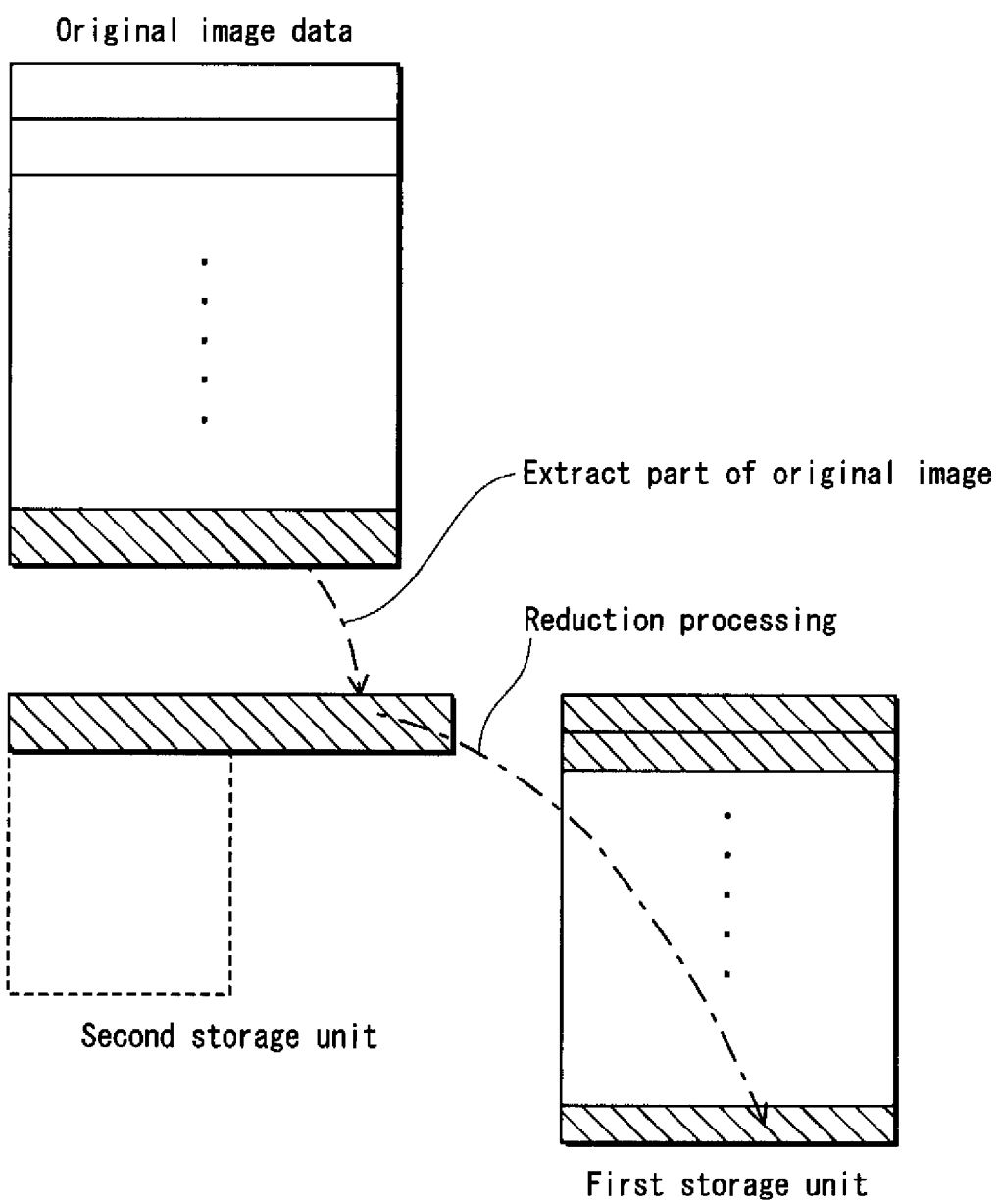
FIG. 8 is a conceptual diagram illustrating use of the first storage unit and the second storage unit when acquisition of an original image is complete during object detection processing by the object detection device in Embodiment 1.

On the other hand, in step S46, if the image reduction control unit 22 determines that reduction processing has been performed on all of the original image data (see FIG. 8) (step S46: Yes), then the image reduction control unit 22 determines whether the absolute reduction rate of reduced image data of original image data stored in the first storage unit 19 has fallen below the absolute reduction rate threshold of 0.11 (step S47).

If, in step S47, the image reduction control unit 22 determines that the absolute reduction rate of the reduced image data stored in the first storage unit 19 has fallen below the absolute reduction rate threshold of 0.11 (step S47: Yes), then processing proceeds to rendering (step S5).

On the other hand, in step S47, if the image reduction control unit 22 determines that the absolute reduction rate of the reduced image data stored in the first storage unit 19 has not fallen below the absolute reduction rate threshold of 0.11 (step S47: No), the image reduction control unit 22 determines whether the relative reduction rate of the part of the original image data (standard image data) stored in the first storage area 18 of the second storage unit 21 has fallen below the relative reduction rate threshold 0.55 (step S48).

In step S48, if the image reduction control unit 22 determines that the relative reduction rate of the part of the original image data stored in the first storage area 18 of the second storage unit 21 has fallen below the relative reduction rate threshold 0.55 (step S48: Yes), processing proceeds to acquisition of part of the original image data from the image memory 2 (step S417), as described below.

On the other hand, in step S48, if the image reduction control unit 22 determines that the relative reduction rate of the part of the original image data stored in the first storage area 18 of the second storage unit 21 has not fallen below the relative reduction rate threshold 0.55 (step S48: No), the image reduction control unit 22 instructs the object detection unit 7 to perform template matching processing. The object detection unit 7 then performs template matching processing on the reduced image data stored in the first storage unit 19 using the template TP for a specified object (step S49).

Figure 9A:
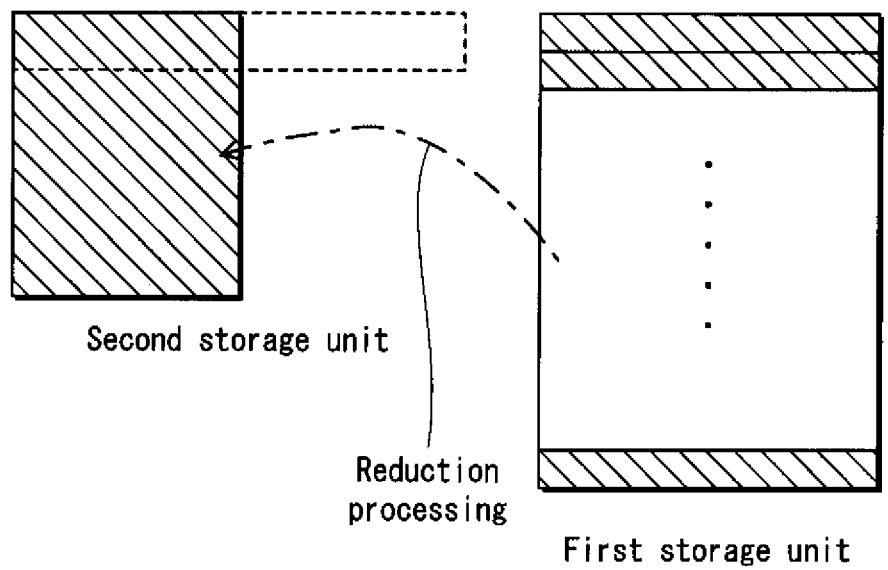
FIGS. 9A and 9B are conceptual diagrams illustrating use of the first storage unit and the second storage unit when transmitting reduced image data back and forth between the first storage unit and the second storage unit during object detection processing by the object detection device in Embodiment 1.

At the same time the object detection unit 7 performs template matching processing on the reduced image data stored in the first storage unit 19, the filter calculation circuit 15 generates reduced image data by performing reduction processing at a reduction rate of 0.82 (=1/1.22) on the reduced image data stored in the first storage unit 19 (step S410) and, as shown in FIG. 9A, stores the reduced image data in the second storage unit 21 (step S411). When storage of reduced image data in the second storage unit 21 is complete, the first storage unit 19 deletes the reduced image data stored in the first storage unit 19.

Next, the image reduction control unit 22 determines whether the absolute reduction rate of reduced image data stored in the second storage unit 21 has fallen below the absolute reduction rate threshold of 0.11 (step S412).

If the image reduction control unit 22 determines that the absolute reduction rate of the reduced image data stored in the second storage unit 21 has fallen below the absolute reduction rate threshold of 0.11 (step S412: Yes), then processing proceeds to rendering (step S5).

On the other hand, in step S412, if the image reduction control unit 22 determines that the absolute reduction rate of the reduced image data stored in the second storage unit 21 has not fallen below the absolute reduction rate threshold of 0.11 (step S412: No), the image reduction control unit 22 determines whether the relative reduction rate of the reduced image data stored in the second storage unit 21 has fallen below the relative reduction rate threshold 0.55 (step S413).

In step S413, if the image reduction control unit 22 determines that the relative reduction rate of the reduced image data has fallen below the relative reduction rate threshold 0.55 (step S413: Yes), processing proceeds to acquisition of part of the original image data from the image memory 2 (step S417), as described below.

On the other hand, if the image reduction control unit 22 determines that the relative reduction rate of the reduced image data stored in the second storage unit 21 has not fallen below the relative reduction rate threshold 0.55 (step S413: No), the image reduction control unit 22 instructs the object detection unit 7 to perform template matching processing. The object detection unit 7 then performs template matching processing on the reduced image data stored in the second storage unit 21 using the template TP for a specified object (step S414).

Figure 9B:
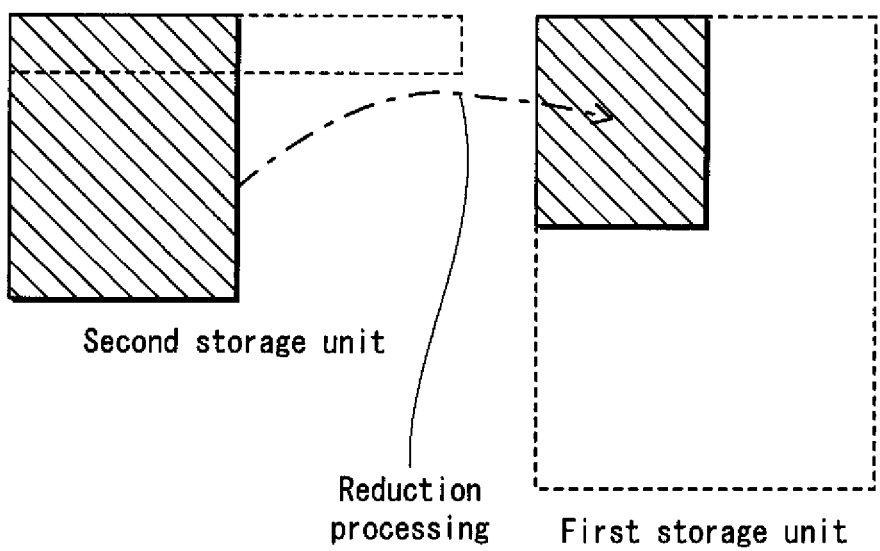

At the same time the object detection unit 7 performs template matching processing on the reduced image data stored in the second storage unit 21, the filter calculation circuit 15 generates reduced image data by performing reduction processing at a reduction rate of 0.82 (=1/1.22) on the reduced image data stored in the second storage unit 21 (step S415). As shown in FIG. 9B, the filter calculation circuit 15 stores the reduced image data in the first storage unit 19 (step S416). Subsequently, processing returns to step S47.

If in step S48 or step S413, the image reduction control unit 22 determines that the relative reduction rate of reduced image data has fallen below the relative reduction rate threshold 0.55 (step S413: Yes), the image reduction control unit 22 acquires part of the original image data from the image memory 2 (step S417). The image reduction control unit 22 then generates reduced image data for the part of the original image data (step S418) and stores the reduced image data in the first storage area 18 of the second storage unit 21 (step S419).

The image reduction control unit 22 stores the absolute reduction rate at the time that processing proceeds from step S48 or step S413 to step S417, and the image reduction control unit 22 causes the filter calculation circuit 15 to perform reduction processing on part of the original image data at a reduction rate equivalent to the absolute reduction rate. For example, if the filter calculation circuit 15 performs reduction processing four times at a reduction rate of 0.82 (=1/1.22) on original image data stored in the second storage unit 21, the image reduction control unit 22 determines that the relative reduction rate 0.45 (=(1/1.22)$^4$) of the reduced image data has fallen below the relative reduction rate threshold 0.55, and processing proceeds from step S48 or step S413 to step S417. At this point, the image reduction control unit 22 stores $1\times(1/1.22)^4$ as the absolute reduction rate of the reduced image data. In step S418, the image reduction control unit 22 causes the filter calculation circuit 15 to perform reduction processing on the original image data at a reduction rate of $1\times(1/1.22)^4$.

Next, the object detection unit 7 performs template matching processing, using the template TP for a specified object, on the reduced image data corresponding to the part of the original image data stored in the first storage area 18 of the second storage unit 21 (step S420).

At the same time the object detection unit 7 performs template matching processing on the reduced image data stored in the second storage unit 21, the filter calculation circuit 15 newly generates reduced image data by performing reduction processing at a reduction rate of 0.82 (=1/1.22) on the reduced image data stored in the first storage area 18 of the second storage unit 21 (step S421) and stores the newly generated reduced image data in the first storage unit 19 (step S422). When storage of newly generated reduced image data in the first storage unit 19 is complete, the second storage unit 21 deletes the reduced image data stored within the second storage unit 21.

Next, the image reduction control unit 22 determines whether or not reduction processing has been performed on all of the reduced image data (step S423).

In step S423, if the image reduction control unit 22 determines that reduction processing has not been completed for all of the reduced image data (step S423: No), the original image data acquisition unit 16 once again acquires part of the original image data from the image memory 2 (step S417). The filter calculation circuit 15 performs reduction processing on the part of the original image data at a reduction rate of $1\times(1/1.22)^4$, which is equivalent to the absolute reduction rate when processing progresses from step S48 or step S413 to step S417, thus generating reduced image data for the part of the original image data (step S418). The filter calculation circuit 15 then stores the reduced image data in the first storage area 18 of the second storage unit 21 (step S419).

On the other hand, if the image reduction control unit 15 determines that reduction processing has been completed for all of the reduced image data (see FIG. 8) (step S423: Yes), the image reduction control unit 22 determines whether the absolute reduction rate of reduced image data stored in the second storage unit 21 has fallen below the absolute reduction rate threshold of 0.11 (step S47).

If, in step S47, the image reduction control unit 22 determines that the absolute reduction rate of the reduced image data stored in the first storage unit 19 has fallen below the absolute reduction rate threshold of 0.11 (step S47: Yes), then processing proceeds to rendering (step S5).

On the other hand, in step S47, if the image reduction control unit 22 determines that the absolute reduction rate of the reduced image data stored in the first storage unit 19 has not fallen below the absolute reduction rate threshold of 0.11 (step S47: No), the image reduction control unit 22 determines whether the relative reduction rate of the part of the reduced image data stored in the first storage area 18 of the second storage unit 21 has fallen below the relative reduction rate threshold 0.55 (step S48).

In step S48, if the image reduction control unit 22 determines that the relative reduction rate of the part of the reduced image data stored in the first storage area 18 of the second storage unit 21 has fallen below the relative reduction rate threshold 0.55 (step S48: Yes), processing proceeds to acquisition of part of the original image data from the image memory 2 (step S417), as described below.

On the other hand, in step S48, if the image reduction control unit 22 determines that the relative reduction rate of the part of the reduced image data (standard image data) stored in the first storage area 18 of the second storage unit 21 has not fallen below the relative reduction rate threshold 0.55 (step S48: No), the image reduction control unit 22 instructs the object detection unit 7 to perform template matching processing. The object detection unit 7 then performs template matching processing on the reduced image data stored in the first storage unit 19 using the template TP for a specified object (step S49).

Subsequently, in step S48 and step S413, while the image reduction control unit 22 determines whether the relative reduction rate of the reduced image data has fallen below the relative reduction rate threshold 0.55, the processing from step S41 to step S423 is repeated. As a result, the object detection circuit 7 performs template matching processing in order first on the original image data, i.e. reduction ID 0, and then on each of the reduced images, i.e. reduction IDs 0, 1, 2, ..., 11.

In the object detection processing by the object detection device in Embodiment 1, while template matching processing is being performed on original image data or reduced image data stored in the second storage unit 21, reduced image data is stored in the first storage unit 19. Furthermore, while template matching processing is being performed on reduced image data stored in the first storage unit 19, reduced image data is stored in the second storage unit 21. Therefore, processing performance is improved.

Note that in Embodiment 1, a description was provided for an example whereby the object detection unit 7 performs template matching processing on all points in all reduced images, but the present invention is not limited in this way. For example, the processing load on the object detection unit 7 may be reduced by selectively reducing the points at which template matching processing is performed.

Also, the object detection unit 7 has been described as using a template that is 24 pixels wide×24 pixels high for template matching processing, but the size of the template is not limited in this way.

Furthermore, in Embodiment 1, the reduction rate during reduction processing by the filter calculation circuit 15 is not limited to the reduction rate expressed in Equation (1).

The object frame display control unit 14 may also extract, from among a plurality of pieces of object detection information, pieces of object detection information for which the difference in reduction IDs is within a predetermined value (for example, two). The object frame display control unit 14 may then integrate the extracted pieces of object detection information and output them to the processor bus 4 as object frame display information.

Embodiment 2

The following describes an object detection system that uses an object detection device 1 according to the present invention.

<1> Structure

The object detection system according to Embodiment 2 is similar to FIG. 1. Only the structure of the object detection device 1 differs. Accordingly, structures that are the same as in FIG. 1 are provided with the same labels, and an explanation thereof is omitted.

Figure 10:
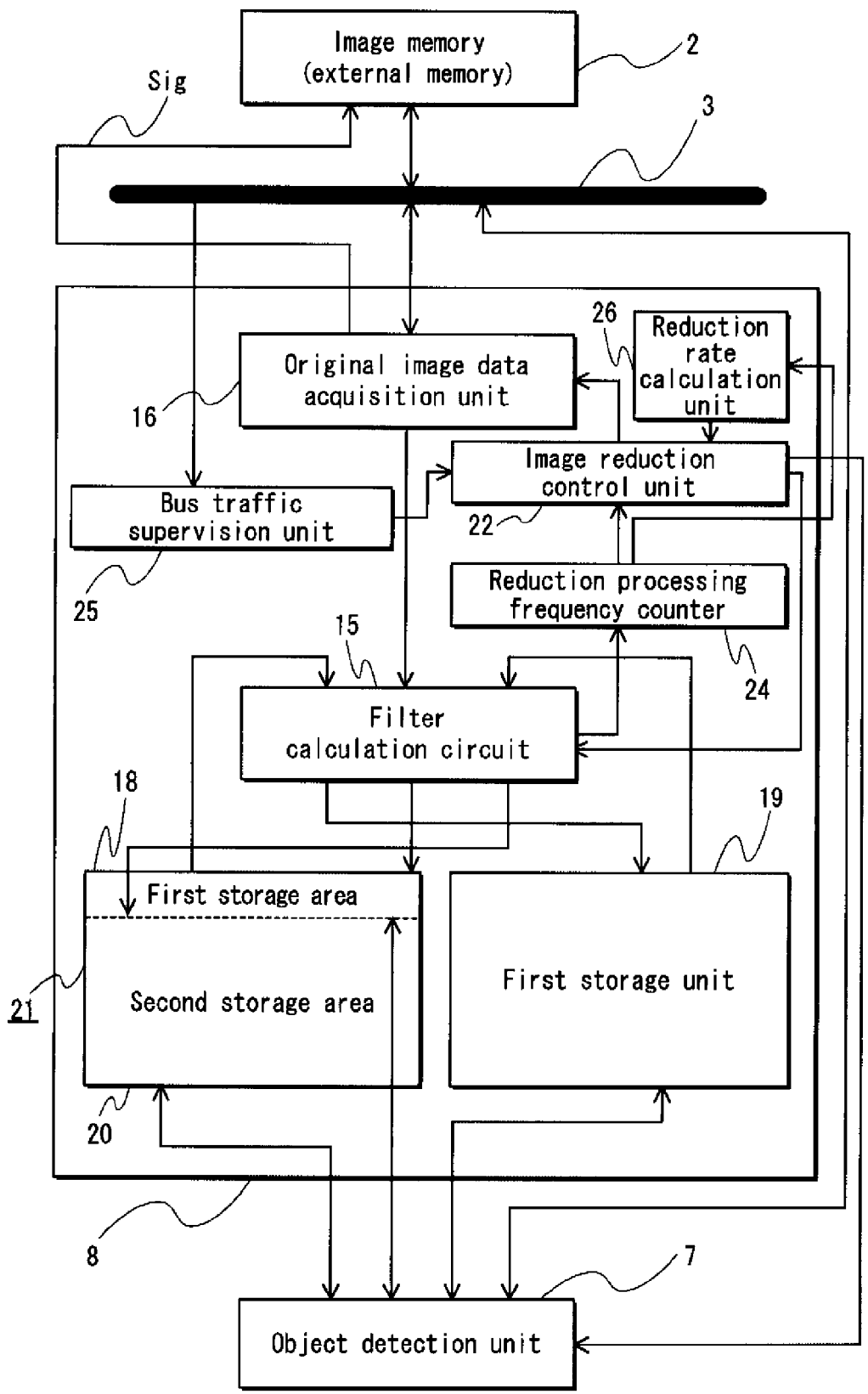
FIG. 10 is a block diagram showing a structure of an object detection device in Embodiment 2.

As shown in FIG. 10, the object detection device 1 is provided a reduced image generation unit 8 and an object detection unit 7. The reduced image generation unit 8 generates a plurality of reduced images from original image data. The object detection unit 7 performs matching processing on the reduced images generated by the reduced image generation unit 8 using a template TP for a specified object in order to detect a position of a specified object within the reduced images.

As in Embodiment 1, the object detection device 1 is also provided with an object detection information storage unit 13 and an object frame display control unit 14. The object detection information storage unit 13 stores a plurality of pieces of object detection information input from the object detection unit 7. The object frame display control unit 14 (i) unifies pieces of information, among the pieces of object detection information stored in the object detection information storage unit 13, for which coordinate positions or reduction IDs are close into one piece of detection information and (ii) outputs the unified piece of information to the processor bus 4 as object frame display information.

The object detection unit 7 performs object detection processing via template matching on original image data that is QVGA resolution (320 pixels wide×240 pixels high) and on a plurality of reduced images that are of resolutions (for example, 256 pixels wide×192 pixels high) lower than QVGA resolution and that are generated by performing reduction processing to reduce the resolution of the original image data.

As shown in FIG. 10, the reduced image generation unit 8 includes the following: an original image data acquisition unit 16, which is a data acquisition unit; a filter calculation circuit 15; a first storage unit 19 and a second storage unit 21; a reduction processing frequency counter 24; a bus traffic supervision unit 25; a reduction rate calculation unit 26; and an image reduction control unit 22.

The filter calculation circuit 15 is a reduction processing unit that generates reduced image data by performing reduction processing on original image data acquired by the original image data acquisition unit 16. The filter calculation circuit 15 performs reduction processing on input original image data or on reduced image data via a widely known method such as downsampling, averaging, etc. The image reduction control unit 22 can change the reduction rate of the filter calculation circuit 15.

The first storage unit 19 has storage capacity that is the same as the size of image data of reduced image data generated by performing reduction processing once on original image data.

The second storage unit 21 has a first storage area 18 and a second storage area 20. The first storage area 18 has storage capacity equivalent to the size of image data of an image that matches the horizontal length of an original image in horizontal length and that matches the vertical height of a template TP in vertical height. The second storage area 20 has storage capacity equivalent to image data for an image that matches, in horizontal length, the horizontal length of a reduced image composed of reduced image data obtained by performing reduction processing twice on an entire original image and that matches, in vertical height, the vertical height of the reduced image minus the vertical height of the template TP.

The original image data acquisition unit 16 is controlled by the image reduction control unit 22, and upon an instruction from the image reduction control unit 22, acquires, by extraction, a part of the original image data, stored in the image memory 2, that is specified by the instruction. The original image data acquisition unit 16 acquires the original image data via the memory bus 3 from the image memory 2 by inputting, into the image memory 2, a transmission request signal Sig.

The reduction processing frequency counter 24 (i) counts the frequency at which the filter calculation circuit 15 repeatedly performs reduction processing on standard image data composed of original image data or reduced image data stored in the first storage area 18 of the second storage unit 21 (hereinafter, "repeated reduction frequency") and the cumulative frequency of the repeated reduction frequency (hereinafter, "cumulative reduction processing frequency") and (ii) outputs the counted values.

The reduction rate calculation unit 26 (i) calculates an absolute reduction rate of reduced image data of original image data from the reduction rates of reduction processing and the total frequency of reduction processing output from the reduction processing frequency counter 24 and (ii) outputs the absolute reduction rate to the image reduction control unit 22.

The bus traffic supervision unit 25 monitors and calculates the amount of traffic in the memory bus and outputs the amount of traffic to the image reduction control unit 22.

The image reduction control unit 22 determines whether to cause the filter calculation circuit 15 to continue reduction processing based on the repeated reduction frequency and on the cumulative reduction processing frequency. The image reduction control unit 22 stores a predetermined threshold for the repeated reduction frequency (hereinafter, "repeated reduction frequency threshold") and compares the repeated reduction frequency input from the reduction processing frequency counter 24 with the repeated reduction frequency threshold. If the image reduction control unit 22 determines that the repeated reduction frequency has exceeded the repeated reduction frequency threshold, the image reduction control unit 22 both causes the filter calculation circuit 15 to stop reduction processing and instructs the original image data acquisition unit 16 to acquire part of the original image data from the image memory 2. Furthermore, the image reduction control unit 22 stores a predetermined threshold for the amount of traffic (hereinafter, "traffic amount threshold") and compares the amount of traffic input from the traffic supervision unit 25 with the traffic amount threshold. If the image reduction control unit 22 determines that the amount of traffic is equal to or less than the traffic amount threshold, the image reduction control unit 22 both causes the filter calculation circuit 15 to stop reduction processing and instructs the original image data acquisition unit 16 to acquire part of the original image data from the image memory 2. Furthermore, the image reduction control unit 22 stores a threshold (hereinafter, "absolute reduction rate threshold") for an absolute reduction rate of reduced image data of original image data and compares an absolute reduction rate input from the reduction rate calculation unit 26 with the absolute reduction rate threshold. If the absolute reduction rate has fallen below the absolute reduction rate threshold, the image reduction control unit 22 both causes the filter calculation circuit 15 to stop reduction processing and outputs an object detection completion notification signal, which notifies the processor 6 that object detection processing is complete, to the processor bus 4.

<2> Operations

Operations by the object detection system according to Embodiment 2 are similar to Embodiment 1. Therefore, only operations that differ during object detection processing are described next. Note that overall operations by the object detection system according to Embodiment 2 are similar to Embodiment 1, and thus a description thereof is omitted.

Figure 11:
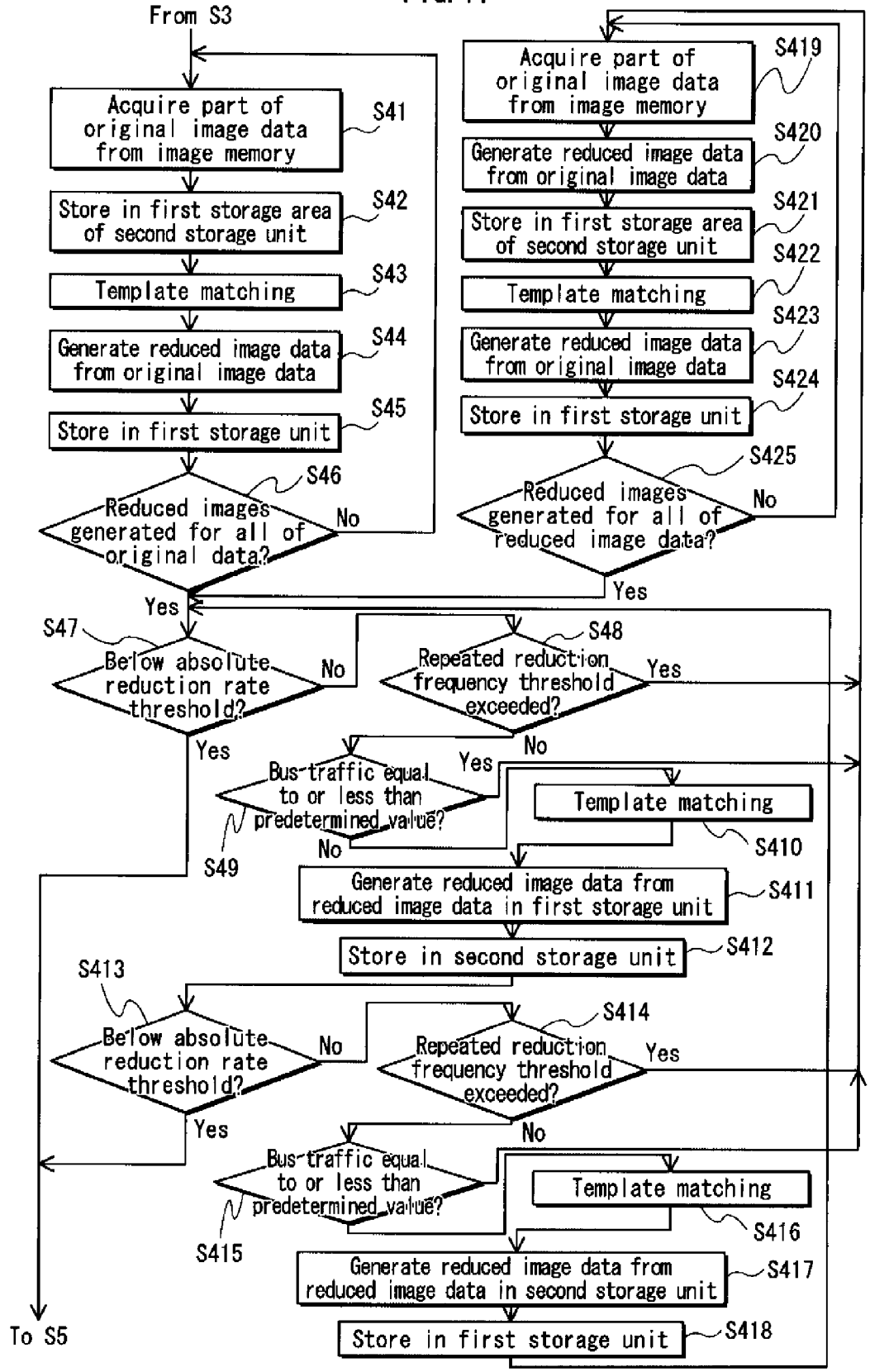
FIG. 11 is a flowchart showing operations during object detection processing by the object detection device in Embodiment 2.

The operations performed during object detection processing in Embodiment 2 are described with reference to the flowchart in FIG. 11.

In the description below, the repeated reduction frequency threshold is set to three times, and the absolute reduction rate threshold is set to $0.11 (=(1/1.22)^{11})$.

First, the original image data acquisition unit 16 acquires, from the image memory 2, a part of original image data of a predetermined size at QVGA resolution within an object detection range set by the processor 6 (step S41).

Next, the original image data acquisition unit 16 stores the original image data as is in the first storage area 18 of the second storage unit 21 (step S42). As shown in FIG. 7, the original image data acquisition unit 16 extracts part of the original image data with a width that is the horizontal length of the original image and a height that is the size of a template TP for a specified object and stores the extracted part of the original image data in the first storage area 18 of the second storage unit 21.

Next, the object detection unit 7 performs template matching processing, using the template TP for a specified object, on the part of the original image data stored in the first storage area 18 of the second storage unit 21 (step S43).

At the same time the object detection unit 7 performs template matching processing on the original image data stored in the second storage unit 21, the filter calculation circuit 15 generates reduced image data by performing reduction processing at a reduction rate of 0.82 (=1/1.22) on part of the original image data stored in the first storage area 18 of the second storage unit 21 (step S44) and stores the reduced image data in the first storage unit 19 (step S45). When storage of reduced image data in the first storage unit 19 is complete, the second storage unit 21 deletes the original image data stored within the second storage unit 21.

Next, the image reduction control unit 22 determines whether or not reduction processing has been performed on all of the original image data (step S46).

If, in step S46, the image reduction control unit 22 determines that reduction processing has not been performed on all of the original image data (step S46: No), then as shown in FIG. 7, the original image data acquisition unit 16 once again acquires, by extraction, part of the original image data stored in the image memory 2 (step S41) and stores the extracted part as is in the first storage area 18 of the second storage unit 21 (step 42).

On the other hand, if the image reduction control unit 22 determines that reduction processing has been performed on all of the original image data (see FIG. 8) (step S46: Yes), then the image reduction control unit 22 determines whether the absolute reduction rate of reduced image data of original image data stored in the first storage unit 19 has fallen below the absolute reduction rate threshold of 0.11 (step S47).

If, in step S47, the image reduction control unit 22 determines that the absolute reduction rate of the reduced image data stored in the first storage unit 19 has fallen below the absolute reduction rate threshold of 0.11 (step S47: Yes), then processing proceeds to rendering (step S5).

On the other hand, in step S47, if the image reduction control unit 22 determines that the absolute reduction rate of the reduced image data stored in the first storage unit 19 has not fallen below the absolute reduction rate threshold of 0.11 (step S47: No), then after the original image data acquisition unit 16 acquires original image data once and stores the original image data in the second storage unit 21, the image reduction control unit 22 determines whether the frequency of reduction processing repeatedly performed on the original image data has exceeded the repeated reduction frequency threshold of three (step S48).

In step S48, if the image reduction control unit 22 determines that the frequency of reduction processing repeatedly performed on the original image data stored in the second storage unit 21 has exceeded the repeated reduction frequency threshold of three (step S48: Yes), processing proceeds to acquisition of part of the original image data from the image memory 2 (step S417), as described below.

On the other hand, if the image reduction control unit 22 determines that the frequency of reduction processing repeatedly performed on the original image data stored in the second storage unit 21 has not exceeded the repeated reduction frequency threshold of three (step S48: No), the image reduction control unit 22 determines whether the bus traffic input from the bus traffic supervision unit 25 is equal to or less than a predetermined traffic threshold (step S49).

In step S49, if the image reduction control unit 22 determines that the bus traffic has fallen below the bus traffic threshold (step S49: Yes), processing proceeds to acquisition of part of the original image data from the image memory 2 (step S419), as described below.

On the other hand, in step S49, if the image reduction control unit 22 determines that the bus traffic has exceeded the bus traffic threshold (step S49: No), the image reduction control unit 22 instructs the object detection unit 7 to perform template matching processing. The object detection unit 7 performs template matching processing on the reduced image data stored in the first storage unit 19 using the template TP for a specified object (step S410).

At the same time the object detection unit 7 performs template matching processing on the reduced image data stored in the first storage unit 19, the filter calculation circuit 15 generates reduced image data by performing reduction processing at a reduction rate of 1/1.22 on the reduced image data stored in the first storage unit 19 (step S411) and stores the reduced image data in the second storage unit 21 (step S412). When storage of reduced image data in the second storage unit 21 is complete, the first storage unit 19 deletes the reduced image data stored in the first storage unit 19.

Next, the image reduction control unit 22 determines whether the absolute reduction rate of reduced image data stored in the second storage unit 21 has fallen below the absolute reduction rate threshold of 0.11 (step S413).

If the image reduction control unit 22 determines that the absolute reduction rate of the reduced image data stored in the second storage unit 21 has fallen below the absolute reduction rate threshold of 0.11 (step S413: Yes), then processing proceeds to rendering (step S5).

On the other hand, in step S413, if the image reduction control unit 22 determines that the absolute reduction rate of the reduced image data stored in the second storage unit 21 has not fallen below the absolute reduction rate threshold of 0.11 (step S413: No), the image reduction control unit 22 determines whether the frequency of reduction processing repeatedly performed on the original image data stored in the second storage unit 21 has exceeded the repeated reduction frequency threshold of three (step S414).

In step S414, if the image reduction control unit 22 determines that the frequency of reduction processing repeatedly performed on the original image data stored in the second storage unit 21 has exceeded the repeated reduction frequency threshold of three (step S414: Yes), processing proceeds to acquisition, by the original image data acquisition unit 16, of part of the original image data from the image memory 2 (step S419), as described below.

On the other hand, in step 414, if the image reduction control unit 22 determines that the frequency of reduction processing repeatedly performed on the original image data stored in the second storage unit 21 has not exceeded the repeated reduction frequency threshold of three (step S414: No), the image reduction control unit 22 determines whether the bus traffic input from the bus traffic supervision unit 25 is equal to or less than a predetermined traffic threshold (step S415).

In step S49, if the image reduction control unit 22 determines that the bus traffic has fallen below the bus traffic threshold (step S415: Yes), processing proceeds to acquisition of part of the original image data from the image memory 2 (step S419), as described below.

On the other hand, in step S415, if the image reduction control unit 22 determines that the bus traffic has exceeded the bus traffic threshold (step S415: No), the image reduction control unit 22 instructs the object detection unit 7 to perform template matching processing. The object detection unit 7 performs template matching processing on the reduced image data stored in the second storage unit 21 using the template TP for a specified object (step S416).

At the same time the object detection unit 7 performs template matching processing on the reduced image data stored in the second storage unit 21, the filter calculation circuit 15 generates reduced image data by performing reduction processing at a reduction rate of 0.82 (=1/1.22) on the reduced image data stored in the second storage unit 21 (step S417). The filter calculation circuit 15 then stores the reduced image data in the first storage unit 19 (step S418). Thereafter, processing returns to step S47.

In step S48, step S49, step S414, or step S415, if the image reduction control unit 22 determines that the frequency of reduction processing repeatedly performed on the original image data stored in the second storage unit 21 has exceeded the repeated reduction frequency threshold of three (step S48, S414: Yes), part of the original image data is acquired from the image memory 2 (step S419).

Next, the filter calculation circuit 15 performs reduction processing on the part of the original image data to generate reduced image data for the part of the original image data (step S420), storing the reduced image data in the first storage area 18 of the second storage unit 21 (step S421).

The image reduction control unit 22 stores the cumulative reduction processing frequency at the point when processing progresses from step S48, step S49, step S414, or step S415 to step S419. The image reduction control unit 22 causes the filter calculation circuit 15 to perform reduction processing on the part of the original image data at the reduction rate corresponding to when reduction processing has been performed a number of times equal to the cumulative reduction processing frequency. For example, if the filter calculation circuit 15 performs reduction processing on the original image data stored in the second storage unit 21 four times at a reduction rate of 0.82 (=1/1.22), the image reduction control unit 22 determines that the frequency of reduction processing has fallen below the repeated reduction frequency threshold of three. Processing then proceeds from step S48 or step S414 to step S419. At this point, the image reduction control unit 22 stores "four" as the cumulative reduction processing frequency. In step S419, the image reduction control unit 22 thus causes the filter calculation circuit 15 to perform reduction processing on the original image data at a reduction rate of $1\times(1/1.22)^4$.

Next, the object detection unit 7 performs template matching processing, using the template TP for a specified object, on the reduced image data corresponding to the part of the original image data stored in the first storage area 18 of the second storage unit 21 (step S422).

At the same time the object detection unit 7 performs template matching processing on the reduced image data stored in the second storage unit 21, the filter calculation circuit 15 newly generates reduced image data by performing reduction processing at a reduction rate of 0.82 (=1/1.22) on the reduced image data stored in the first storage area 18 of the second storage unit 21 (step S423) and stores the newly generated reduced image data in the first storage unit 19 (step S424). When storage of newly generated reduced image data in the first storage unit 19 is complete, the second storage unit 21 deletes the reduced image data stored within the second storage unit 21.

Next, the image reduction control unit 22 determines whether or not reduction processing has been performed on all of the reduced image data (step S425).

In step S425, if the image reduction control unit 22 determines that reduction processing has not been completed for all of the reduced image data (step S425: No), the original image data acquisition unit 16 once again acquires part of the original image data from the image memory 2 (step S419). The filter calculation circuit 15 performs reduction processing on the part of the original image data at a reduction rate of $1\times(1/1.22)^4$, which corresponds to when reduction processing has been performed a number of times equal to the cumulative reduction processing frequency of four when processing progresses from step S48 or step S414 to step S419, thus generating reduced image data for the part of the original image data (step S420). The filter calculation circuit 15 then stores the reduced image data in the first storage area 18 of the second storage unit 21 (step S421).

On the other hand, if the image reduction control unit 22 determines that reduction processing has been completed for all of the reduced image data (step S425: Yes), the image reduction control unit 22 determines whether the cumulative reduction processing frequency for the original image data has exceeded the reduction threshold (step S47).

Subsequently, by repeating the processing from step S47 to step S425, the object detection circuit 7 performs template matching processing in order first on the original image data, i.e. reduction ID 0, and then on each of the reduced images, i.e. reduction IDs 0, 1, 2, ..., 11.

Embodiment 3

The following describes an object detection system that uses an object detection device 1 according to the present invention.

<1> Structure

The object detection system according to Embodiment 3 is similar to FIG. 1. Only the structure of the second storage unit 21 differs. Accordingly, structures that are the same as in FIG. 1 are provided with the same labels, and an explanation thereof is omitted.

Figure 12:
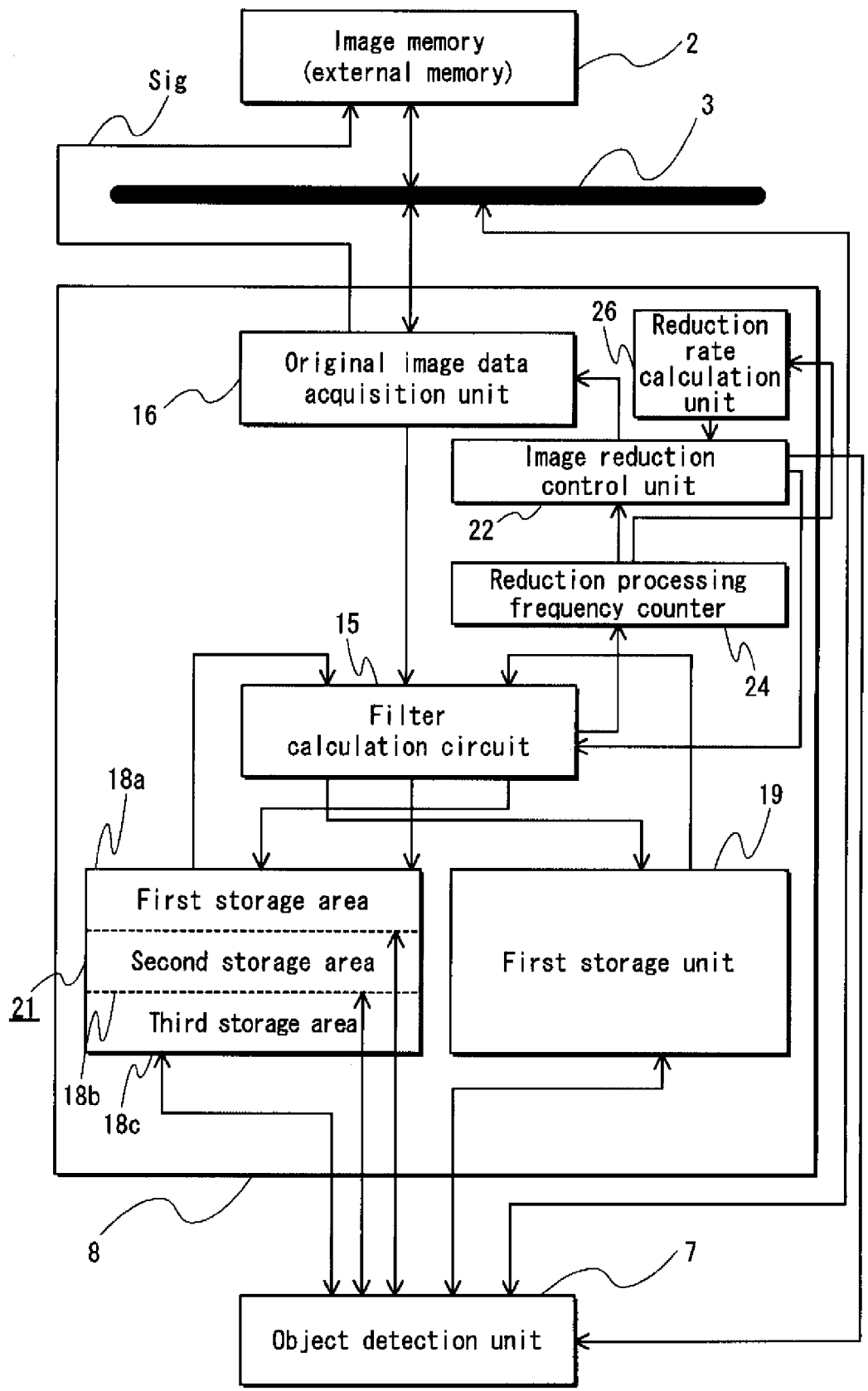
FIG. 12 is a block diagram showing a structure of an object detection device in Embodiment 3.

As shown in FIG. 12, the object detection device 1 is provided with a reduced image generation unit 8 and an object detection unit 7. The reduced image generation unit 8 generates a plurality of reduced images from original image data. The object detection unit 7 performs matching processing on the reduced images generated by the reduced image generation unit 8 using a template TP for a specified object in order to detect a position of a specified object within the reduced images.

As in Embodiment 1, the object detection device 1 is also provided with an object detection information storage unit 13 and an object frame display control unit 14. The object detection information storage unit 13 stores a plurality of pieces of object detection information input from the object detection unit 7. The object frame display control unit 14 (i) unifies pieces of information, among the pieces of object detection information stored in the object detection information storage unit 13, for which coordinate positions or reduction IDs are close into one piece of detection information and (ii) outputs the unified piece of information to the processor bus 4 as object frame display information.

The object detection unit 7 performs object detection processing via template matching on original image data that is QVGA resolution (320 pixels wide×240 pixels high) and on a plurality of reduced images that are of resolutions (for example, 256 pixels wide×192 pixels high) lower than QVGA resolution and that are generated by performing reduction processing to reduce the resolution of the original image data.

As shown in FIG. 12, the reduced image generation unit 8 includes the following: an original image data acquisition unit 16, which is a data acquisition unit; a filter calculation circuit 15; a first storage unit 19 and a second storage unit 21; a reduction processing frequency counter 24; a reduction rate calculation unit 26; and an image reduction control unit 22.

The filter calculation circuit 15 is a reduction processing unit that generates reduced image data by performing reduction processing on original image data acquired by the original image data acquisition unit 16. The filter calculation circuit 15 performs reduction processing on input original image data or on reduced image data via a widely known method such as downsampling, averaging, etc. The image reduction control unit 22 can change the reduction rate of the filter calculation circuit 15.

The first storage unit 19 has storage capacity equivalent to the size of image data of an image that matches, in horizontal length, the horizontal length of a reduced image composed of reduced image data generated by performing reduction processing once on original image data and that matches, in vertical height, twice the vertical height of the template TP.

The second storage unit 21 is composed of a first storage area 18a, second storage area 18b, and third storage area 18c that have storage capacity equivalent to the size of image data of an image that matches, in horizontal length, the horizontal length of an original image and that matches, in vertical height, the vertical height of the template TP.

The original image data acquisition unit 16 is controlled by the image reduction control unit 22, and upon an instruction from the image reduction control unit 22, acquires, by extraction, a part of the original image data, stored in the image memory 2, that is specified by the instruction. The original image data acquisition unit 16 acquires, by extraction, image data that represents a first region (second region or third region) of the original image and that matches, in horizontal length, the horizontal length of the original image and, in vertical height, the vertical height of the template TP. The original image data acquisition unit 16 acquires the original image data via the memory bus 3 from the image memory 2 by inputting, into the image memory 2, a transmission request signal Sig.

The reduction processing frequency counter 24 (i) counts the frequency at which the filter calculation circuit 15 repeatedly performs reduction processing on standard image data composed of original image data or reduced image data stored in the first storage area 18 of the second storage unit 21 (hereinafter, "repeated reduction frequency") and the cumulative frequency of the repeated reduction frequency (hereinafter, "cumulative reduction processing frequency") and (ii) outputs the counted values.

The reduction rate calculation unit 26 (i) calculates an absolute reduction rate of reduced image data of original image data from the reduction rates of reduction processing and the total frequency of reduction processing output from the reduction processing frequency counter 24 and (ii) outputs the absolute reduction rate to the image reduction control unit 22.

The image reduction control unit 22 determines whether to cause the filter calculation circuit 15 to continue reduction processing based on the repeated reduction frequency and on the cumulative reduction processing frequency.

Upon completion of template matching processing that is performed on reduced image data that is generated by performing reduction processing once on the reduced image data stored in the first storage area 19 and that is stored in the second storage unit 21, the image reduction control unit 22 both causes the filter calculation circuit 15 to stop reduction processing and instructs the original image data acquisition unit 16 to acquire part of the original image data from the image memory 2. In other words, the image reduction control unit 22 both causes the filter calculation circuit 15 to stop reduction processing and instructs the original image data acquisition unit 16 to acquire part of the original image data from the image memory 2 when the cumulative reduction processing frequency reaches two, or when the repeated reduction frequency reaches three in the case that the cumulative reduction processing frequency is three or higher. The image reduction control unit 22 stores a threshold (hereinafter, "absolute reduction rate threshold") for an absolute reduction rate of reduced image data of original image data and compares an absolute reduction rate input from the reduction rate calculation unit 26 with the absolute reduction rate threshold. If the absolute reduction rate has fallen below the absolute reduction rate threshold, the image reduction control unit 22 causes the filter calculation circuit 15 to stop reduction processing. When object detection processing is complete for all of the original image data, the image reduction control unit 22 outputs an object detection completion notification signal, which notifies the processor 6 that object detection processing is complete, to the processor bus 4.

<2> Operations

Operations by the object detection system according to Embodiment 3 are similar to Embodiment 1. Therefore, only operations that differ during object detection processing are described next. Note that overall operations by the object detection system according to Embodiment 3 are similar to Embodiment 1, and thus a description thereof is omitted.

Figure 13:
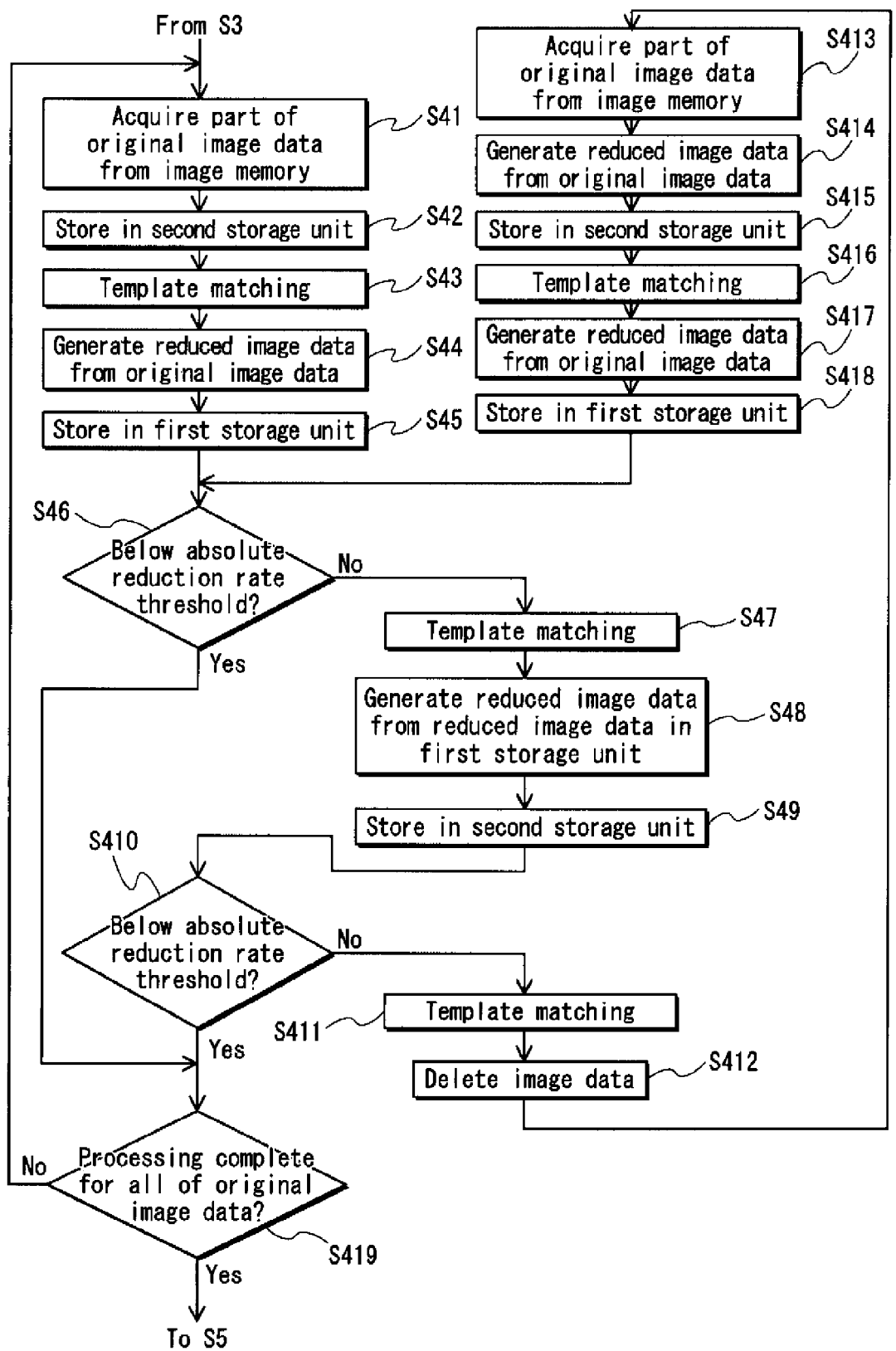
FIG. 13 is a flowchart showing operations during object detection processing by the object detection device in Embodiment 3.

The operations performed during object detection processing in Embodiment 3 are described with reference to the flowchart in FIG. 13.

In the description below, the absolute reduction rate threshold is set to 0.11 (=$(1/1.22)^{11}$).

Figure 14A:
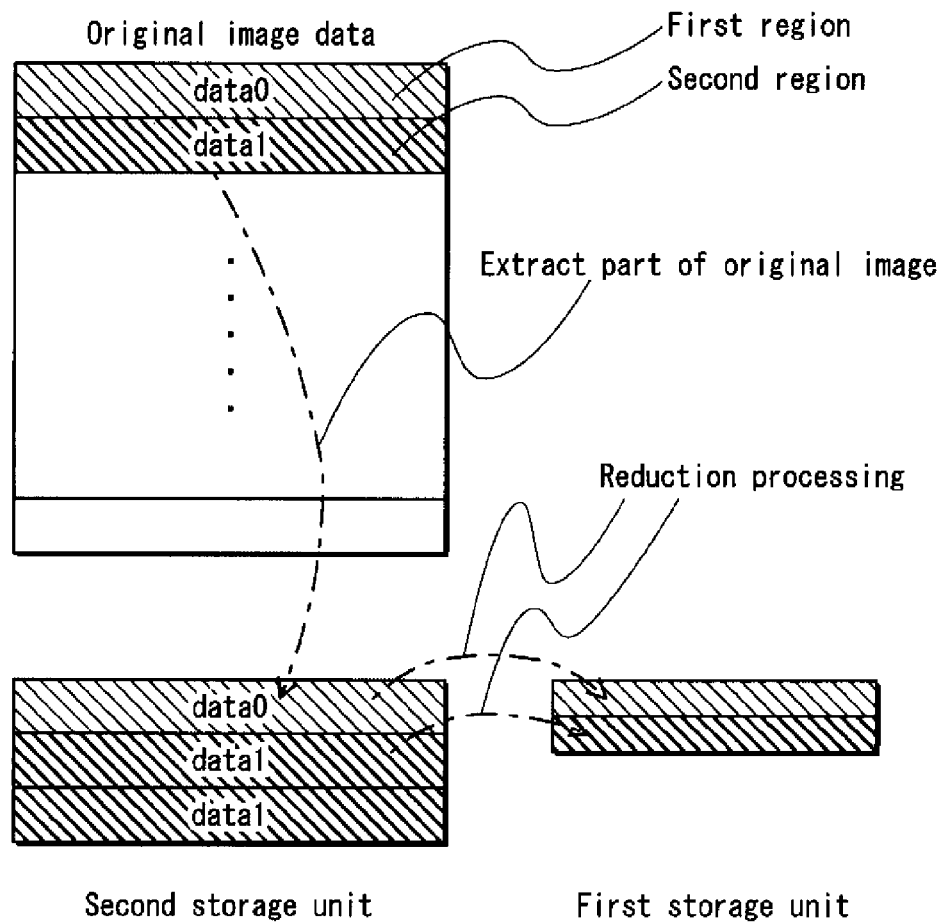
FIGS. 14A and 14B are conceptual diagrams illustrating use of a first storage unit and a second storage unit during object detection processing by the object detection device in Embodiment 3.

First, the original image data acquisition unit 16 acquires, from the image memory 2, a part of original image data of a predetermined size at QVGA resolution within an object detection range set by the processor 6 (step S41). As shown in FIG. 14A, the original image data acquisition unit 16 acquires, by extraction, (i) image data 0 that represents a first region of the original image and that matches, in horizontal length, the horizontal length of the original image and, in vertical height, the vertical height of the template TP, and (ii) image data 1 that represents a second region of the original image and that is the same size as the first region. As shown in FIG. 14A, the two pieces of image data 0 and 1 correspond to the first region and the second region of the original image, which are adjacent to each other.

Next, the original image data acquisition unit 16 stores the two pieces of image data 0 and 1 as they are in the second storage unit 21 (step S42). As shown in FIG. 14A, the original image data acquisition unit 16 stores the image data 0 in the first storage area 18a, the image data 1 in the second storage area 18b, and the same image data 1 as stored in the second storage area 18b in the third storage area 18c.

Next, the object detection unit 7 performs template matching processing on the image data 0 stored in the first storage area 18a of the second storage unit 21 and on the image data 1 stored in the second storage area 18b of the second storage unit 21 using the template TP for a specified object (step S43). The object detection unit 7 performs template matching processing by sliding the template TP one pixel at a time horizontally with respect to part of the original image represented by the pieces of image data 0 and 1.

At the same time the object detection unit 7 performs template matching processing on the image data 0 and image data 1 stored in the second storage unit 21, the filter calculation circuit 15 generates reduced image data by performing reduction processing at a reduction rate of 0.82 (=1/1.22) on the pieces of image data 0 and 1 respectively stored in the first storage area 18a and the second storage area 18b of the second storage unit 21 (step S44) and stores the reduced image data in the first storage unit 19 (step S45). When storage of reduced image data in the first storage unit 19 is complete, the second storage unit 21 deletes the image data 0 and the image data 1 respectively stored in the first storage area 18a and the second storage area 18b. However, the second storage unit 21 does not delete the image data 1 stored in the third storage area 18c.

Next, the image reduction control unit 22 determines whether the absolute reduction rate of reduced image data stored in the first storage unit 19 has fallen below the absolute reduction rate threshold of 0.11 (step S46).

If, in step S46, the image reduction control unit 22 determines that the absolute reduction rate has fallen below the absolute reduction rate threshold of 0.11 (step S46: Yes), processing proceeds to step S419, described below.

On the other hand, in step S46, if the image reduction control unit 22 determines that the absolute reduction rate of the reduced image data stored in the first storage unit 19 has not fallen below the absolute reduction rate threshold of 0.11 (step S46: No), the image reduction control unit 22 instructs the object detection unit 7 to perform template matching processing. The object detection unit 7 then performs template matching processing on the reduced image data stored in the first storage unit 19 using the template TP for a specified object (step S47).

Figure 14B:
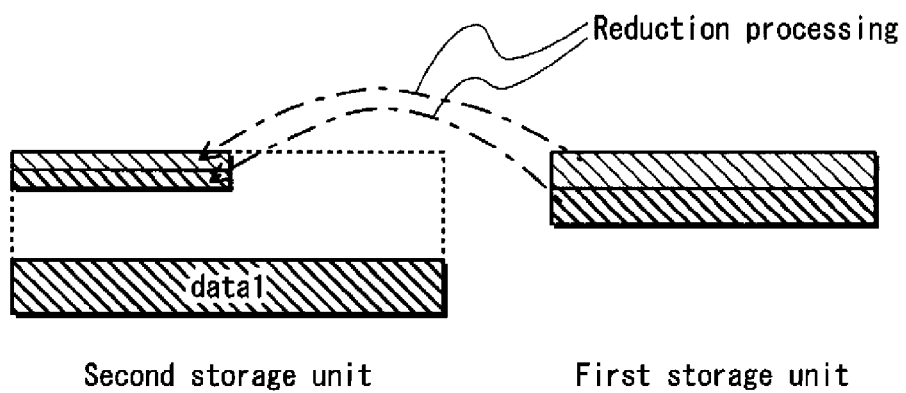

At the same time the object detection unit 7 performs template matching processing on the reduced image data stored in the first storage unit 19, the filter calculation circuit 15 generates reduced image data by performing reduction processing at a reduction rate of 1/1.22 on the reduced image data stored in the first storage unit 19 (step S48) and stores the reduced image data in the second storage unit 21 (step S49). At this point, the reduced image data generated by the filter calculation circuit 15 is stored in either the first storage area 18a or the second storage area 18b in the second storage unit 21, as shown in FIG. 14B. When storage of reduced image data in the second storage unit 21 is complete, the first storage unit 19 deletes the reduced image data stored in the first storage unit 19.

Next, the image reduction control unit 22 determines whether the absolute reduction rate of reduced image data stored in the second storage unit 21 has fallen below the absolute reduction rate threshold of 0.11 (step S410).

If, in step S410, the image reduction control unit 22 determines that the absolute reduction rate of the reduced image data stored in the second storage unit 21 has fallen below the absolute reduction rate threshold of 0.11 (step S410: Yes), processing proceeds to step S419, described below.

On the other hand, in step S410, if the image reduction control unit 22 determines that the absolute reduction rate of the reduced image data stored in the second storage unit 21 has not fallen below the absolute reduction rate threshold of 0.11 (step S410: No), the object detection unit 7 performs template matching processing on the reduced image data stored in the second storage unit 21 using the template TP for a specified object (step S411).

Subsequently, the first storage unit 19 and the second storage unit 21 delete the original image data or reduced image data stored therein (step S412).

Figure 16:
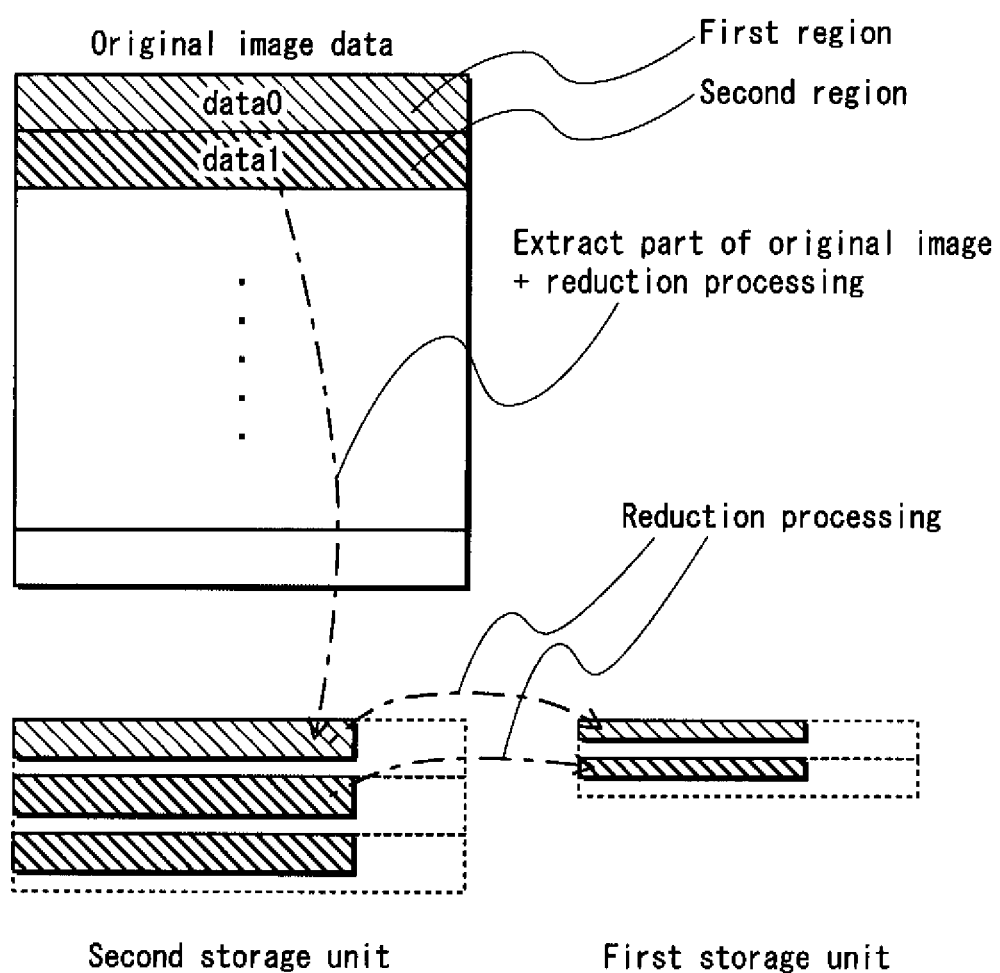
FIG. 16 is a conceptual diagram illustrating use of the first storage unit and the second storage unit during object detection processing by the object detection device in Embodiment 3.
Figure 18:
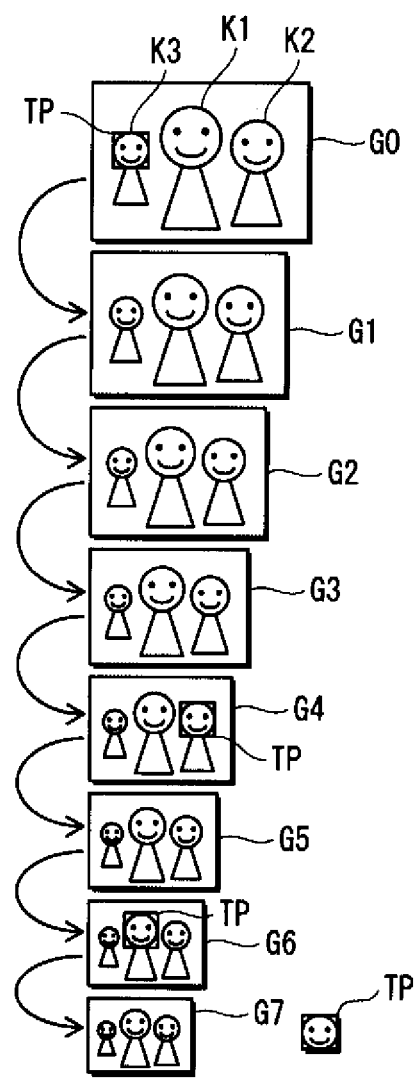
FIG. 18 illustrates template matching processing performed by a conventional object detection device.
Figure 19:
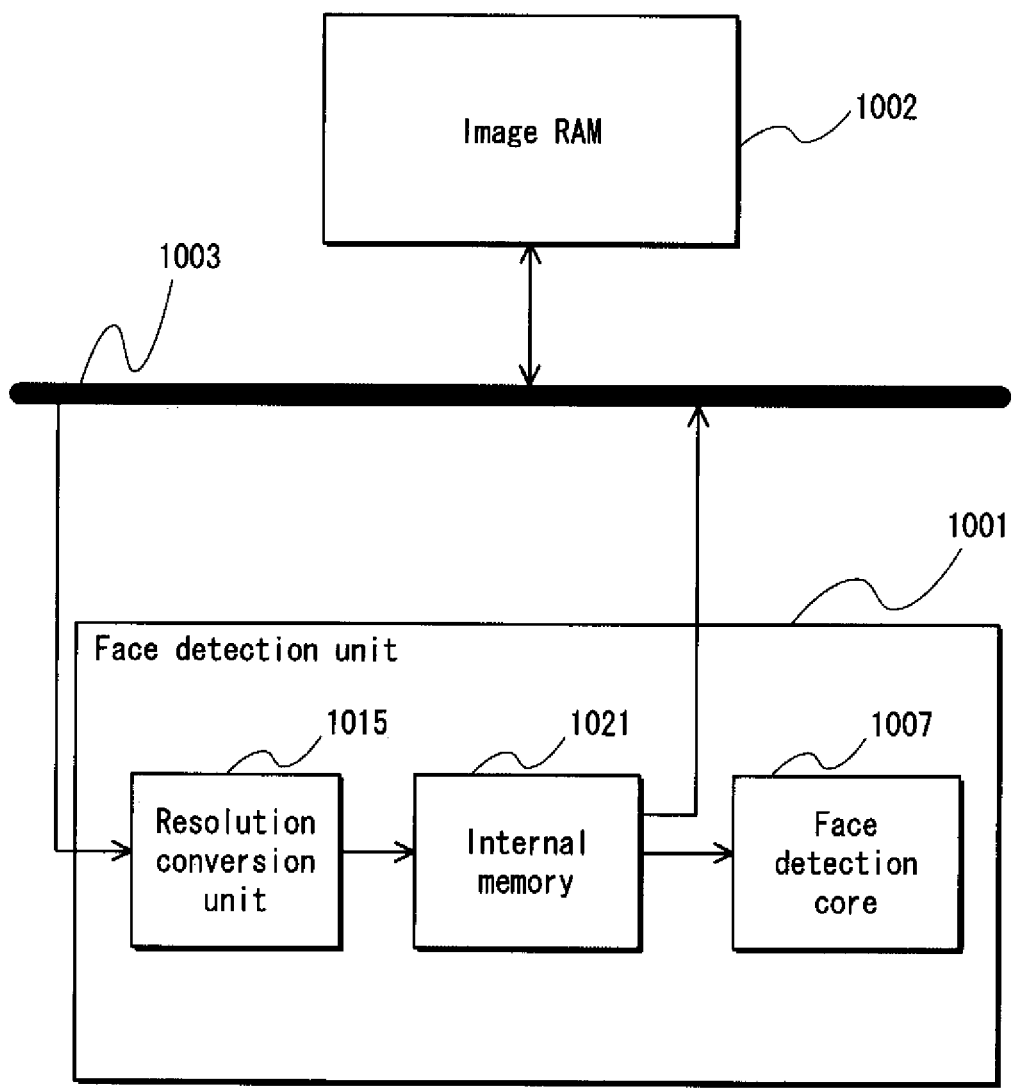
FIG. 19 is a block diagram showing a structure of a conventional object detection device.

Next, the original image data acquisition unit 16 acquires part of the original image data from the image memory 2 (step S413). As shown in FIG. 16, the original image data acquisition unit 16 acquires two pieces of image data by extraction, image data 0 and 1.

Next, the filter calculation circuit 15 performs reduction processing on the pieces of image data 0 and 1 to generate reduced image data (step S414), storing the reduced image data in the first storage area 18a and second storage area 18b of the second storage unit 21 (step S415). As shown in FIG. 16, the filter calculation circuit 15 stores reduced image data corresponding to the image data 0 in the first storage area 18a, reduced image data corresponding to the image data 1 in the second storage area 18b, and reduced image data that is the same as the reduced image data stored in the second storage area 18b in the third storage area 18c.

The image reduction control unit 22 stores the cumulative reduction processing frequency at the point when step S411 is complete. The image reduction control unit 22 causes the filter calculation circuit 15 to perform reduction processing on part of the original image data at the reduction rate corresponding to when reduction processing has been performed a number of times equal to the cumulative reduction processing frequency. For example, if the filter calculation circuit 15 has performed reduction processing on the original image data stored in the second storage unit 21 twice at a reduction rate of 0.82 (=1/1.22), the image reduction control unit 22 stores "two" as the cumulative reduction processing frequency. In step S414, the image reduction control unit 22 thus causes the filter calculation circuit 15 to perform reduction processing on the original image data at a reduction rate of 1×(1/1.22).

Next, the object detection unit 7 performs template matching processing, using the template TP for a specified object, on the reduced image data corresponding to the part of the original image data stored in the first storage area 18 of the second storage unit 21 (step S416).

At the same time the object detection unit 7 performs template matching processing on the reduced image data stored in the second storage unit 21, the filter calculation circuit 15 newly generates reduced image data by performing reduction processing at a reduction rate of 0.82 (=1/1.22) on the reduced image data stored in the first storage area 18a and the second storage area 18b of the second storage unit 21 (step S417) and stores the newly generated reduced image data in the first storage unit 19 (step S418). When storage of newly generated reduced image data in the first storage unit 19 is complete, the second storage unit 21 deletes the reduced image data stored in the first storage area 18a and the second storage area 18b. However, the second storage unit 21 does not delete the reduced image data stored in the third storage area 18c. Subsequently, processing proceeds to step S46.

In step S419, the image reduction control unit 22 determines whether processing is complete for all of the original image data.

In step S419, if the image reduction control unit 22 determines that processing is complete for all of the original image data (step S419: Yes), then processing proceeds to rendering (step S5).

Figure 15A:
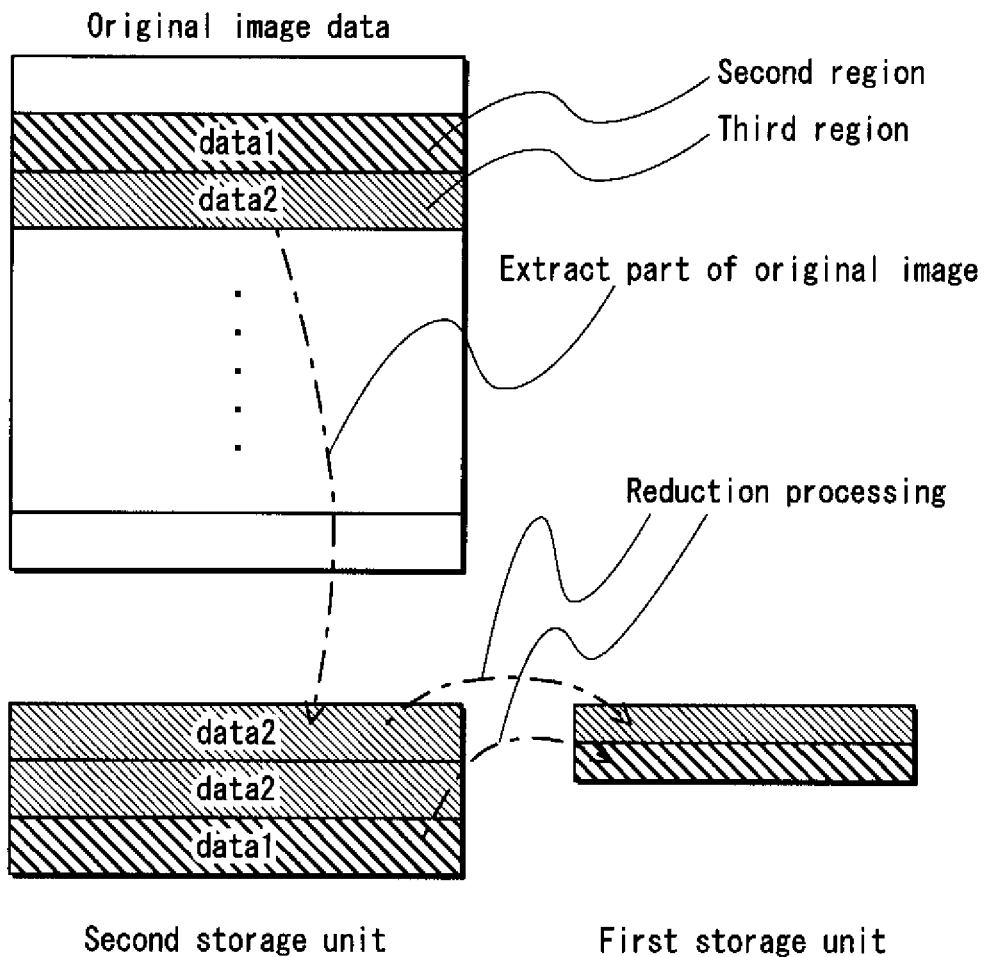
FIGS. 15A and 15B are conceptual diagrams illustrating use of the first storage unit and the second storage unit during object detection processing by the object detection device in Embodiment 3.
Figure 15B:
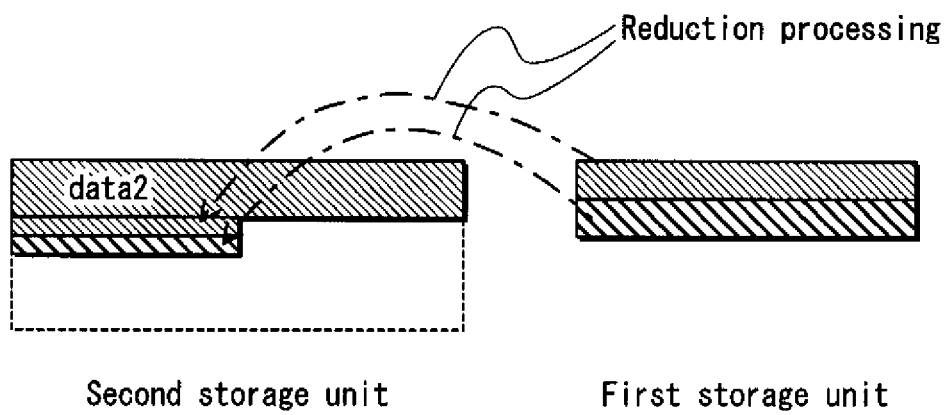

On the other hand, in step S419, if the image reduction control unit 22 determines that processing is not complete for all of the original image data (step S419: No), the original image data acquisition unit 16 once again acquires part of the original image data from the image memory 2 (step S41). As shown in FIG. 15A, the original image data acquisition unit 16 acquires, by extraction, image data 2 that represents a third region of the original image and that matches, in horizontal length, the horizontal length of the original image and, in vertical height, the vertical height of the template TP. As shown in FIG. 15A, the image data 2 is a region adjacent, in the vertical direction of the original image, to the region represented by the previously acquired image data 1. The image data 2 is adjacent to the region represented by image data 1 on the opposite side of the region represented by the image data 0.

Next, the original image data acquisition unit 16 stores the image data 2 as is in the second storage unit 21 (step S42). As shown in FIG. 15A, the original image data acquisition unit 16 stores the image data 2 in the first storage area 18a and also stores the same image data 2 in the second storage area 18b.

Next, the object detection unit 7 performs template matching processing on the image data 1 stored in the third storage area 18c of the second storage unit 21 and on the image data 2 stored in the second storage area 18b of the second storage unit 21 using the template TP for a specified object (step S43). The object detection unit 7 performs template matching processing by sliding the template TP one pixel at a time horizontally with respect to part of the original image represented by the pieces of image data 1 and 2. Whereas in step S43 described above, template matching processing is performed on image data 0 representing the first region and on image data 1 representing the second region, in the present step S43, template matching processing is performed on image data 1 representing the second region and on image data 2 representing the third region. In other words, the first and second regions represented by image data 0 and 1, as acquired by the original image data acquisition unit 16 the first time, and the second and third regions represented by the image data 1 and 2, as acquired by the original image data acquisition unit 16 the second time, share the second region in common. Accordingly, it becomes possible to perform template matching processing on the original image by sliding the template one pixel at a time, thus making it possible to improve precision of object detection.

At the same time the object detection unit 7 performs template matching processing on the image data 1 and image data 2 stored in the second storage unit 21, the filter calculation circuit 15 generates reduced image data by performing reduction processing at a reduction rate of 0.82 (=1/1.22) on the pieces of image data 1 and 2 respectively stored in the third storage area 18c and the second storage area 18b (step S44) and stores the reduced image data in the first storage unit 19 (step S45). When storage of reduced image data in the first storage unit 19 is complete, the second storage unit 21 deletes the image data 1 and the image data 2 respectively stored in the third storage area 18c and the second storage area 18b. However, the second storage unit 21 does not delete the image data 2 stored in the first storage area 18a.

Subsequently, by repeating the processing from step S41 to step S419, the object detection circuit 7 performs template matching processing in order first on the original image data, i.e. reduction ID 0, and then on each of the reduced images, i.e. reduction IDs 0, 1, 2, . . . , 11.

<Modifications>

(1) The example in Embodiment 1 has been described as follows. A reduction rate calculation unit 23 that outputs a relative reduction rate of reduced image data stored in the first storage area 18 of the second storage unit 21 is provided. The image reduction control unit 22 stores a relative reduction rate threshold and compares the relative reduction rate input from the reduction rate calculation unit 23 with the relative reduction rate threshold. If the relative reduction rate has exceeded the relative reduction rate threshold, the image reduction control unit 22 both causes the filter calculation circuit 15 to stop reduction processing and causes the original image data acquisition unit 16 to acquire part of the original image data from the image memory 2. However, the present invention is not limited in this way. For example, instead of the reduction rate calculation unit 22, a reduction processing frequency counter 24 may be provided, as in Embodiment 2. The image reduction control unit 22 may store a repeated reduction frequency threshold and compare the repeated reduction frequency input from the reduction processing frequency counter 24 with the repeated reduction frequency threshold. If the image reduction control unit 22 determines that the repeated reduction frequency has exceeded the repeated reduction frequency threshold, the image reduction control unit 22 may both cause the filter calculation circuit 15 to stop reduction processing and instruct the original image data acquisition unit 16 to acquire part of the original image data from the image memory 2.

(2) The example in Embodiment 2 has been described as follows. A reduction processing frequency counter 24 that counts the frequency with which the filter calculation circuit 15 performs reduction processing on reduced image data stored in the first storage unit 19 is provided. The image reduction control unit 22 stores a repeated reduction frequency threshold and compares the repeated reduction frequency input from the reduction processing frequency counter 24 with the repeated reduction frequency threshold. If the image reduction control unit 22 determines that the repeated reduction frequency has exceeded the repeated reduction frequency threshold, the image reduction control unit 22 both causes the filter calculation circuit 15 to stop reduction processing and instructs the original image data acquisition unit 16 to acquire part of the original image data from the image memory 2. However, the present invention is not limited in this way. For example, instead of the reduction processing frequency counter 24, a reduction rate calculation unit 23 that outputs a relative reduction rate of reduced image data stored in the first storage area 18 of the second storage unit 21 may be provided, as in Embodiment 1. The image reduction control unit 22 may store a relative reduction rate threshold and compare the relative reduction rate input from the reduction rate calculation unit 23 with the relative reduction rate threshold. If the relative reduction rate has exceeded the relative reduction rate threshold, the image reduction control unit 22 may both cause the filter calculation circuit 15 to stop reduction processing and cause the original image data acquisition unit 16 to acquire part of the original image data from the image memory 2.

(3) The example in Embodiment 2 has been described as follows. The image reduction control unit 22 stores an absolute reduction rate threshold and compares the absolute reduction rate input from the reduction rate calculation unit 23 with the absolute reduction rate threshold. If the absolute reduction rate has fallen below the absolute reduction rate threshold, the image reduction control unit 22 both causes the filter calculation circuit 15 to stop reduction processing and outputs an object detection completion notification signal, which notifies the processor 6 that object detection processing is complete, to the processor bus 4. However, the present invention is not limited in this way. For example, instead of providing a reduction rate calculation unit 26, the reduction processing frequency counter 23 may be made to output a cumulative value of the frequency of repeated reduction (hereinafter, "cumulative frequency") to the image reduction control unit 22. The image reduction control unit 22 may store a predetermined threshold for the cumulative reduction processing frequency (hereinafter, "cumulative frequency threshold") and compare the cumulative frequency input from the reduction processing frequency counter 23 with the cumulative frequency threshold. If the cumulative frequency has exceeded the cumulative frequency threshold, the image reduction control unit 22 may both cause the filter calculation circuit 15 to stop reduction processing and output an object detection completion notification signal, which notifies the processor 6 that object detection processing is complete, to the processor bus 4.

(4) In Embodiments 1-3, the image reduction control unit 22 may, for example, be provided with a threshold varying unit (not shown in the figures) that changes the relative reduction rate threshold in accordance with image quality of original image data, such as contrast or brightness.

The original image data may be obtained, for example, by photography via the camera 10. In this case, original image data that is obtained by photography at a bright location with a fast shutter speed (short exposure time) has high image quality and a high S/N ratio. Conversely, original image data that is obtained by photography at a dark location with a slow shutter speed (long exposure time) has poor image quality and a low S/N ratio. Therefore, if the filter calculation circuit 15 generates reduced image data from the original image data via downsampling or another method, then as the S/N ratio of the original image data becomes lower, it is necessary to raise the relative reduction rate threshold to prevent the reduced image data from becoming distorted.

In this respect, the threshold varying unit in the present Modification sets the relative reduction rate threshold lower when the shutter speed of the camera 10 is set to a fast speed, as the S/N ratio of the original image data is likely to be high. On the other hand, if the shutter speed of the camera 10 is set to a slow speed, the S/N ratio of the original image data is likely to be low, and therefore the threshold varying unit sets the relative reduction rate threshold higher. In this way, in accordance with the image quality of original image data, the relative reduction rate can be changed so that the reduced image data does not become distorted. This improves the precision of object detection.

(5) As shown in FIG. 4, in Embodiments 1-3, an example has been described in which the reduced image generation unit 8 generates different reduced images at 11 levels of resolution. However, the present invention is not limited in this way. For example, as shown in FIG. 17, the reduced image generation unit 8 may reduce the horizontal and vertical number of pixels to the resolutions represented in Equation 2.

number of pixels in horizontal direction=(number of pixels in horizontal direction at QVGA resolution)×$(1/1.11)^n$ number of pixels in vertical direction=(number of pixels in vertical direction at QVGA resolution)× $(1/1.11)^n$ Equation (2)

In this Modification, as shown in FIG. 17, different reduced images are generated at 22 levels of resolution. By performing template matching processing on each of the pieces of reduced image data, a specified object included in the original image is detected to a higher degree of precision.

(6) A camera with object detection functions that can switch between object detection functions in accordance with an object may be provided with the object detection device 1 in Embodiments 1-3.

For example, in this Modification, two modes may be provided: a "portrait mode" used when photographing a person's ID photo or the like, and a "landscape mode" used when photographing a landscape. When the camera is set to "portrait mode", the region occupied by a person in the original image grows larger, and therefore the absolute reduction rate threshold is set higher. Conversely, when the camera is set to "landscape mode", the region occupied by a person in the original image grows smaller, and therefore the absolute reduction rate threshold is set smaller. The most appropriate object detection function for an object is thus achieved.

(7) The example in Embodiment 2 has been described as follows. The original image data acquisition unit 16 first acquires part of the original image data from the image memory 2 and stores the part of the original image data as is in the second storage unit 21. However, the present invention is not limited in this way. Reduced image data, generated by the filter calculation circuit 15 reducing, at a predetermined reduction rate, the original image data acquired by the original image data acquisition unit 16, may be stored in the second storage unit 21. The processing burden on the object detection unit 7 is thus reduced when it is not necessary to perform template matching processing on the original image data.

(8) Embodiments 1-3 may also be an integrated circuit for object detection processing that is provided with a motion estimation circuit, a processor, and a circuit. The motion estimation circuit acquires the image data stored in an external memory and detects a region of a predetermined size in which a moving specified object appears from within the entire image data. The processor controls the motion estimation circuit based on a control signal input from an image processing circuit. The circuit has the same function as the object detection device 1, i.e. to detect the position of the moving specified object, which is detected by the motion estimation circuit and appears in a region of a predetermined size, in greater detail. The integrated circuit is further provided with an image processing circuit, an image output circuit, a motion estimation circuit, and a bus that transfers the image data between (i) each of the object detection device in claim 1 and the processor, and (ii) the image memory.

<Supplementary Explanation>

Depending on the degree of integration, the LSI described in Modification (4) may be referred to as an Integrated Circuit (IC), system LSI, Very Large Scale Integration (VLSI), Super Large Scale Integration (SLSI), Ultra Large Scale Integration (ULSI), etc.

The method of integration is not limited to LSI, and dedicated circuitry or general circuitry may be used. A Field Programmable Gate Array (FPGA), which is programmable after the LSI is manufactured, or a reconfigurable processor, which allows reconfiguration of the connection and setting of circuit cells inside the LSI, may be used.

The object detection device according to the present invention can be used in a device that performs object detection by generating a plurality of reduced images from original image data by reduction processing and performing matching on the reduced images with a template for a specified object. The object detection device according to the present invention is useful for object detection processing in digital still cameras, digital movies, etc., and can also be adapted for use in surveillance cameras.

The invention claimed is:

1. An object detection device sharing a bus with an external memory and another device, the object detection device comprising:
a data acquisition unit configured to acquire original image data from the external memory via the bus;
a storage unit configured to store the original image data acquired by the data acquisition unit and a plurality of pieces of reduced image data generated from the original image data;
a reduction processing unit configured to generate the pieces of reduced image data from the original image data at differing reduction rates; and
an object detection unit configured to detect a position of a specified object by performing matching processing on the pieces of reduced image data using an object template;
wherein the storage unit includes a first storage unit and a second storage unit,
the object detection unit is configured to perform matching processing on each piece of reduced image data stored in the first storage unit using the object template,
when the reduction processing unit stores, in the second storage unit, reduced image data generated by performing reduction processing at a predetermined reduction rate on a piece of reduced image data stored in the first storage unit, the piece of reduced image data stored in the first storage unit is deleted,
the object detection unit is configured to perform matching processing on the reduced image data stored in the second storage unit using the object template, and
when the reduction processing unit stores, in the first storage unit, reduced image data generated by performing reduction processing at the predetermined reduction rate on the reduced image data stored in the second storage unit, the reduced image data stored in the second storage unit is deleted.

2. The object detection device of claim 1, further comprising
a reduction rate calculation unit configured to calculate a relative reduction rate, with respect to standard image data that is the original image data or reduced image data, of reduced image data generated by the reduction processing unit repeatedly performing reduction processing on the standard image data at a predetermined reduction rate; and
an image reduction control unit configured (i) to store a relative reduction rate threshold that is a threshold for the relative reduction rate of the reduced image data generated by the reduction processing unit and (ii) to cause the data acquisition unit to acquire the original image data from the external memory when the relative reduction rate calculated by the reduction rate calculation unit falls below the relative reduction rate threshold.

3. The object detection device of claim 2, wherein
when the original image data acquired by the data acquisition unit is stored in the second storage unit, the object detection unit performs matching processing on the original image data stored in the second storage unit using the object template, and
when the reduction processing unit stores, in the first storage unit, reduced image data generated by performing reduction processing at the predetermined reduction rate on the original image data stored in the second storage unit, the original image data stored in the second storage unit is deleted.

4. The object detection device of claim 3, further comprising
a threshold varying unit configured to vary the relative reduction rate threshold in accordance with image quality of the original image data.

5. The object detection device of claim 3, further comprising
a bus traffic supervision unit configured to supervise bus traffic in the bus, wherein
the image reduction control unit causes the data acquisition unit to acquire the original image data from the external memory when bus traffic detected by the bus traffic supervision unit is equal to or less than a predetermined value.

6. The object detection device of claim 3, wherein
the reduction rate calculation unit is configured to calculate an absolute reduction rate of the reduced image data of the original image data, and
the image reduction control unit stores an absolute reduction rate threshold of the absolute reduction rate and stops the reduction processing by the reduction processing unit when the absolute reduction rate falls below the absolute reduction rate threshold.

7. The object detection device of claim 6, wherein
the first storage unit has storage capacity equivalent to a size of reduced image data generated by performing reduction processing once on the original image data, and
the second storage unit includes
a first storage area having a storage capacity equivalent to a size of image data having dimensions that match a horizontal length of the original image data and a vertical height of the object template and
a second storage area having a storage capacity equivalent to a size of image data whose dimensions match (i) a horizontal length of a reduced image formed by reduced image data generated by performing reduction processing one more time on reduced image data generated by performing reduction processing once on the original image data stored by the second storage unit and (ii) a vertical height of the reduced image minus the vertical height of the object template.

8. The object detection device of claim 2, wherein
when the reduction processing unit stores, in the second storage unit, reduced image data generated by performing reduction processing at any reduction rate on the original image data obtained by the data acquisition unit, the object detection unit performs matching processing on the reduced image data stored in the second storage unit using the object template, and
when the reduction processing unit stores, in the first storage unit, reduced image data generated by performing reduction processing at the predetermined reduction rate on the reduced image data stored in the second storage unit, the reduced image data stored in the second storage unit is deleted.

9. The object detection device of claim 2, wherein
the storage unit includes (i) the first storage unit and (ii) the second storage unit, the second storage unit including a first storage area, a second storage area, and a third storage area, when a first piece of image data is stored in the first storage area, a second piece of image data is stored in the second storage area, and a piece of image data identical to the second piece of image data is stored in the third storage area, the first piece of image data and the second piece of image data representing a first region and a second region that form part of the original image data acquired by the data acquisition unit, then the object detection unit performs matching processing on the first piece of image data and the second piece of image data using the object template, when the reduction processing unit stores, in the first storage unit, reduced image data generated by performing reduction processing at the predetermined reduction rate on the first piece of image data and the second piece of image data, then only the first piece of image data and the second piece of image data stored in the second storage unit are deleted, and the object detection unit performs matching processing on reduced image data stored in the first storage unit using the object template, and when the reduction processing unit stores, in the first storage area and the second storage area of the second storage unit, reduced image data obtained by performing reduction processing at the predetermined reduction rate on the reduced image data stored in the first storage unit, then the object detection unit performs matching processing on the reduced image data stored in the first storage area and in the second storage area using the object template, only the reduced image data recorded in the first storage area and in the second storage area of the second storage unit are deleted, a third piece of image data representing a third region that differs from the first region and the second region and that forms part of the original image data acquired by the data acquisition unit is stored in the first storage area, and a piece of image data identical to the third piece of image data is stored in the second storage area.

10. The object detection device of claim 9, wherein
the first storage unit has storage capacity equivalent to a size of image data having dimensions that match (i) a horizontal length of a reduced image formed by reduced image data generated by performing reduction processing once on the original image data and (ii) a vertical height that is twice a vertical height of the object template, and the second storage unit includes a first storage area, a second storage area, and a third storage area that each have a storage capacity equivalent to a size of image data whose dimensions match a horizontal length of the original image data and a vertical height of the object template.

11. The object detection device of claim 1, further comprising
a reduction processing frequency counter configured to count a frequency of reduction processing by the reduction processing unit on standard image data that is the original image data or reduced image data; and an image reduction control unit configured (i) to store a reduction processing threshold for the frequency of reduction processing and (ii) to cause the data acquisition unit to acquire the original image data from the external memory when the frequency of reduction processing exceeds the reduction processing threshold.

12. An object detection system comprising:
an image processing device configured to perform predetermined image processing on externally input original image data;

an image memory storing original image data output by the image processing device;

a motion estimation device configured to acquire the original image data stored by the image memory and to detect a region in the original image data in which a moving specified object appears;

a processor configured to control the motion estimation device in accordance with a control signal input from the image processing device;

the object detection processing device of claim 1 configured to detect a position of a specified object in the region detected by the motion estimation device in greater detail; and a bus configured to transfer the original image data between (i) each of the image processing device, the motion estimation device, the processor, and the object detection processing device of claim 1, and (ii) the image memory.

13. An integrated circuit for object detection processing, comprising:
a motion estimation circuit configured to acquire original image data stored by an external memory and to detect a region in the original image data in which a moving specified object appears;

a processor configured to control the motion estimation circuit in accordance with a control signal input from the image processing circuit;

the object detection processing device of claim 1 configured to detect a position of a specified object in the region detected by the motion estimation circuit in greater detail; and a bus configured to transfer the original image data between (i) each of the image processing circuit, an image output circuit, the motion estimation circuit, the processor, and the object detection processing device of claim 1, and (ii) the image memory.

14. A camera with an object detection function, comprising:
a camera unit;

an image display device configured to display an image photographed by the camera;

an image processing device configured to perform image processing on image data input from the camera;

an image memory storing image data output by the image processing device;

an image display control device configured to cause the image display device to display the image data stored in the image memory;

a motion estimation device configured to acquire the image data stored by the image memory and to detect a region in the image data in which a moving specified object appears;

a processor configured to control the motion estimation device in accordance with a control signal input from the image processing device;

the object detection processing device of claim 1 configured to detect a position of a specified object in the region detected by the motion estimation device in greater detail; and a bus configured to transfer the image data between (i) each of the image processing device, the image display control device, the motion estimation device, the processor, and the object detection processing device of claim 1, and (ii) the image memory.

15. An object detection method comprising:
acquiring original image data from external memory via a bus;

generating a plurality of pieces of reduced image data having differing reduction rates by performing reduction processing on the original image data acquired in said acquiring original image data;

detecting a position at which an object appears in the pieces of reduced image data by performing matching processing on the pieces of reduced image data using an object template, performing matching processing using an object detection unit on each piece of reduced image data stored in a first storage unit using the object template;

storing, using a reduction processing unit, in a second storage unit, reduced image data generated by performing reduction processing at a predetermined reduction rate on a piece of reduced image data stored in the first storage unit, and deleting the piece of reduced image data stored in the first storage unit;

performing matching processing using the object detection unit on the reduced image data stored in the second storage unit using the object template; and storing, using the reduction processing unit, in the first storage unit, reduced image data generated by performing reduction processing at the predetermined reduction rate on the reduced image data stored in the second storage unit, and deleting the reduced image data stored in the second storage unit.

* * * * *